(12) United States Patent
Shipman

(10) Patent No.: US 10,406,969 B2
(45) Date of Patent: *Sep. 10, 2019

(54) VEHICULAR LIGHT ASSEMBLY WITH LIGHT SENSOR

(71) Applicant: Michael Shipman, Newport Coast, CA (US)

(72) Inventor: Michael Shipman, Newport Coast, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/907,023

(22) Filed: Feb. 27, 2018

(65) Prior Publication Data

US 2018/0186280 A1    Jul. 5, 2018

Related U.S. Application Data

(63) Continuation of application No. 15/593,817, filed on May 12, 2017, now Pat. No. 9,919,645, which is a
(Continued)

(51) Int. Cl.
| | |
|---|---|
| *B60Q 1/26* | (2006.01) |
| *B60Q 1/50* | (2006.01) |
| *F21K 9/64* | (2016.01) |
| *F21V 9/06* | (2018.01) |
| *G02B 5/20* | (2006.01) |

(Continued)

(52) U.S. Cl.
CPC .......... *B60Q 1/2611* (2013.01); *B60Q 1/2696* (2013.01); *B60Q 1/503* (2013.01); *F21K 9/64* (2016.08); *F21S 43/14* (2018.01); *F21S 43/235* (2018.01); *F21V 9/06* (2013.01); *G02B 5/208* (2013.01); *G09F 13/18* (2013.01); *G09F 13/20* (2013.01); *G09F 13/22* (2013.01);
(Continued)

(58) Field of Classification Search
CPC .... B60Q 1/2611; B60Q 1/2696; B60Q 1/503; F21S 43/14; F21S 43/235; G09F 13/22; G09F 21/04; G09F 2013/222; G09F 2013/227
See application file for complete search history.

(56) References Cited

U.S. PATENT DOCUMENTS

| | | |
|---|---|---|
| 1,192,982 A | 8/1916 | Bristol et al. |
| 1,373,167 A | 3/1921 | Brooks |

(Continued)

FOREIGN PATENT DOCUMENTS

WO    WO 0048166 A1 * 8/2000 ............ G09F 13/22

*Primary Examiner* — Mary Ellen Bowman
(74) *Attorney, Agent, or Firm* — David Duckworth

(57) ABSTRACT

A vehicle lighting system is provided primarily for use with emergency response vehicles. The lighting system includes luminescent alphanumeric characters affixed upon a planar vehicle mounting plate so as to emit light upwardly so as to be seen from the air. The vehicle lighting system also includes a light bar affixed to the planar plate. The light bar is positioned to illuminate light primarily horizontally so as to be seen by those on the ground. Preferably, the luminescent planar sheets are connected by wiring to the light bar so that luminescent planar sheet obtains power from the light bar. In addition, the light bar includes a light sensor electrically connected between the power source and luminescent planar sheets which automatically disables the luminescent panels when ambient light is above a predetermined threshold.

15 Claims, 23 Drawing Sheets

Related U.S. Application Data continuation of application No. 14/736,997, filed on Jun. 11, 2015, now Pat. No. 9,656,597, which is a continuation of application No. 14/512,171, filed on Oct. 10, 2014, now Pat. No. 9,656,597, which is a continuation-in-part of application No. 14/070,925, filed on Nov. 4, 2013, now Pat. No. 9,010,976, which is a continuation-in-part of application No. 13/385,697, filed on Mar. 2, 2012, now Pat. No. 8,585,263, which is a continuation-in-part of application No. 61/464,515, filed on Mar. 4, 2011.

(51) Int. Cl.

| | | |
|---|---|---|
| *F21S 43/14* | (2018.01) | |
| *G09F 13/18* | (2006.01) | |
| *G09F 13/20* | (2006.01) | |
| *G09F 13/22* | (2006.01) | |
| *G09F 21/04* | (2006.01) | |
| *F21S 43/235* | (2018.01) | |

(52) U.S. Cl.
CPC ........ *G09F 21/04* (2013.01); *G09F 2013/222* (2013.01); *G09F 2013/225* (2013.01); *G09F 2013/227* (2013.01)

(56) References Cited

U.S. PATENT DOCUMENTS

| | | |
|---|---|---|
| 2,891,140 A | 6/1959 | Huff |
| 4,028,828 A | 6/1977 | Chao et al. |
| 4,426,028 A | 1/1984 | Bott |
| 4,645,970 A | 2/1987 | Murphy |
| 4,879,826 A | 11/1989 | Wittke |
| 5,211,466 A | 5/1993 | Jarocki et al. |
| 5,255,164 A | 10/1993 | Eidelman |
| 5,359,796 A | 11/1994 | Werling |
| 5,497,572 A | 3/1996 | Hoffman |
| 5,636,462 A | 6/1997 | Kleiman |
| 5,711,100 A | 1/1998 | Elmer |
| 5,884,997 A | 3/1999 | Stanuch et al. |
| 5,934,797 A | 8/1999 | Schlaudroff et al. |
| 6,056,425 A | 5/2000 | Appelberg |
| 6,081,191 A | 6/2000 | Green et al. |
| 6,449,889 B1 | 9/2002 | Hottenstein |
| 6,735,893 B2 | 5/2004 | Wolf |
| 6,955,455 B2 | 10/2005 | Schneider |
| 7,118,239 B2 | 10/2006 | Itoh et al. |
| 7,121,700 B1 | 10/2006 | Scanlon |
| 7,350,949 B2 | 4/2008 | Meinke et al. |
| 7,467,846 B2 | 12/2008 | Karppinen et al. |
| 7,468,677 B2 | 12/2008 | Pederson et al. |
| 7,589,622 B2 | 9/2009 | Farley |
| 7,621,662 B1 | 11/2009 | Colbert |
| 7,635,209 B2 | 12/2009 | Uematsu et al. |
| 7,825,790 B2 | 11/2010 | Tallinger |
| 7,931,393 B2 | 4/2011 | Stempinski |
| 9,656,597 B2 * | 5/2017 | Shipman .............. B60Q 1/2611 |
| 9,919,645 B2 * | 3/2018 | Shipman .............. B60Q 1/2611 |
| 2002/0062589 A1 | 5/2002 | Miller |
| 2002/0171542 A1 | 11/2002 | Bloomfield et al. |
| 2004/0227370 A1 | 11/2004 | Bader et al. |
| 2004/0231209 A1 | 11/2004 | Love |
| 2004/0260470 A1 | 12/2004 | Rast |
| 2005/0018441 A1 | 1/2005 | Menke et al. |
| 2006/0072303 A1 | 4/2006 | Dunkle et al. |
| 2007/0008093 A1 | 1/2007 | Nigro et al. |
| 2007/0103922 A1 | 5/2007 | Rissmiller et al. |
| 2007/0234612 A1 | 10/2007 | Corbishley et al. |
| 2008/0236007 A1 | 10/2008 | Au et al. |
| 2009/0116257 A1 | 5/2009 | Rosemeyer et al. |
| 2010/0194556 A1 | 8/2010 | LaRosa |
| 2011/0167689 A1 | 7/2011 | Ford |

\* cited by examiner

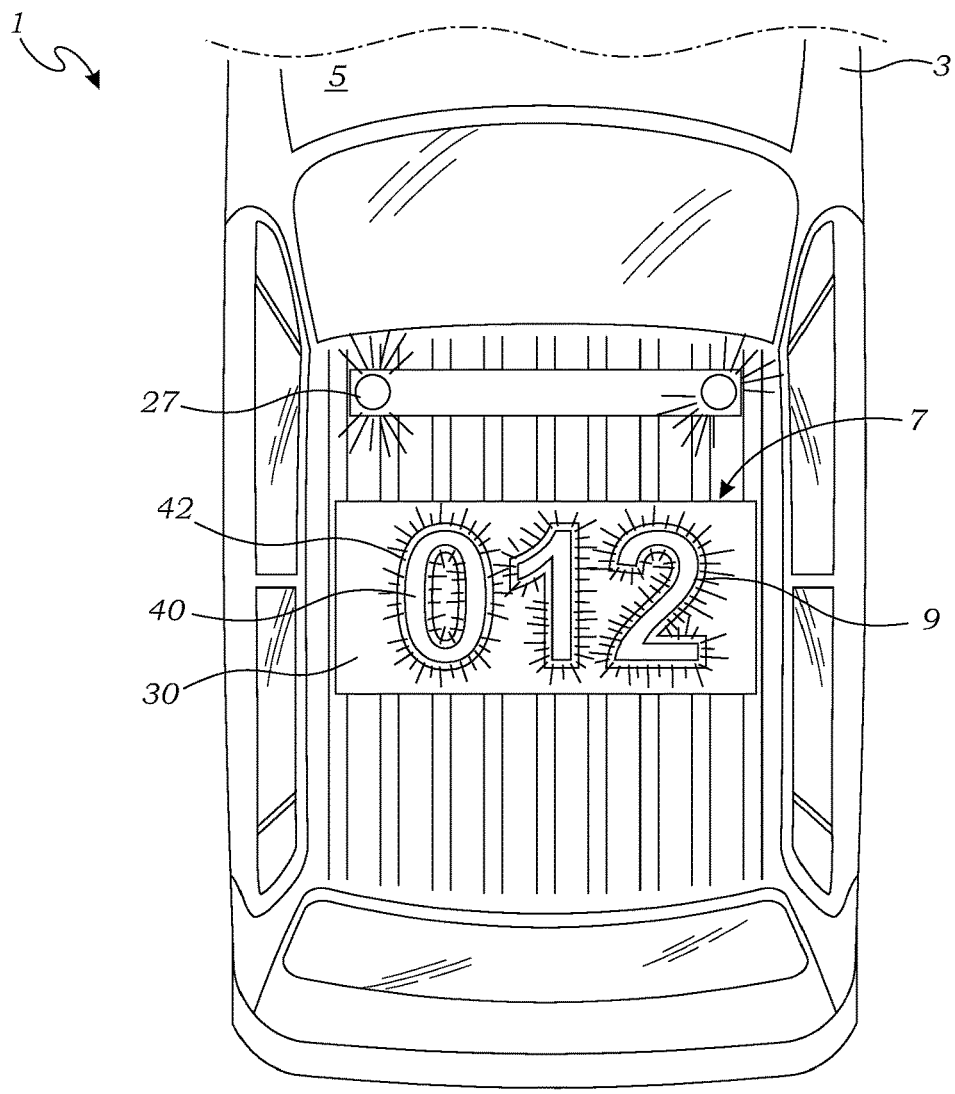
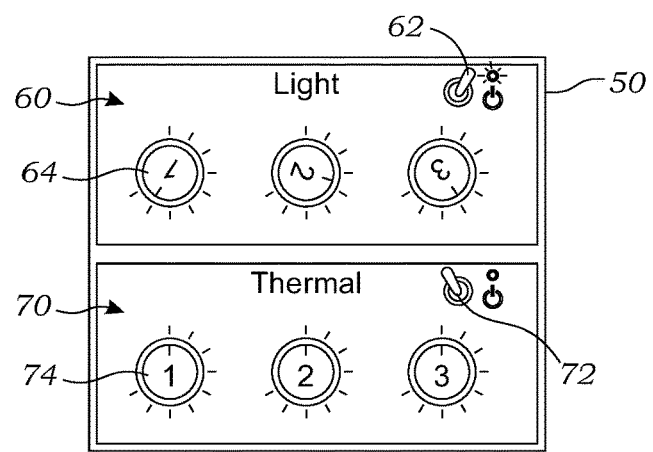
Fig. 14

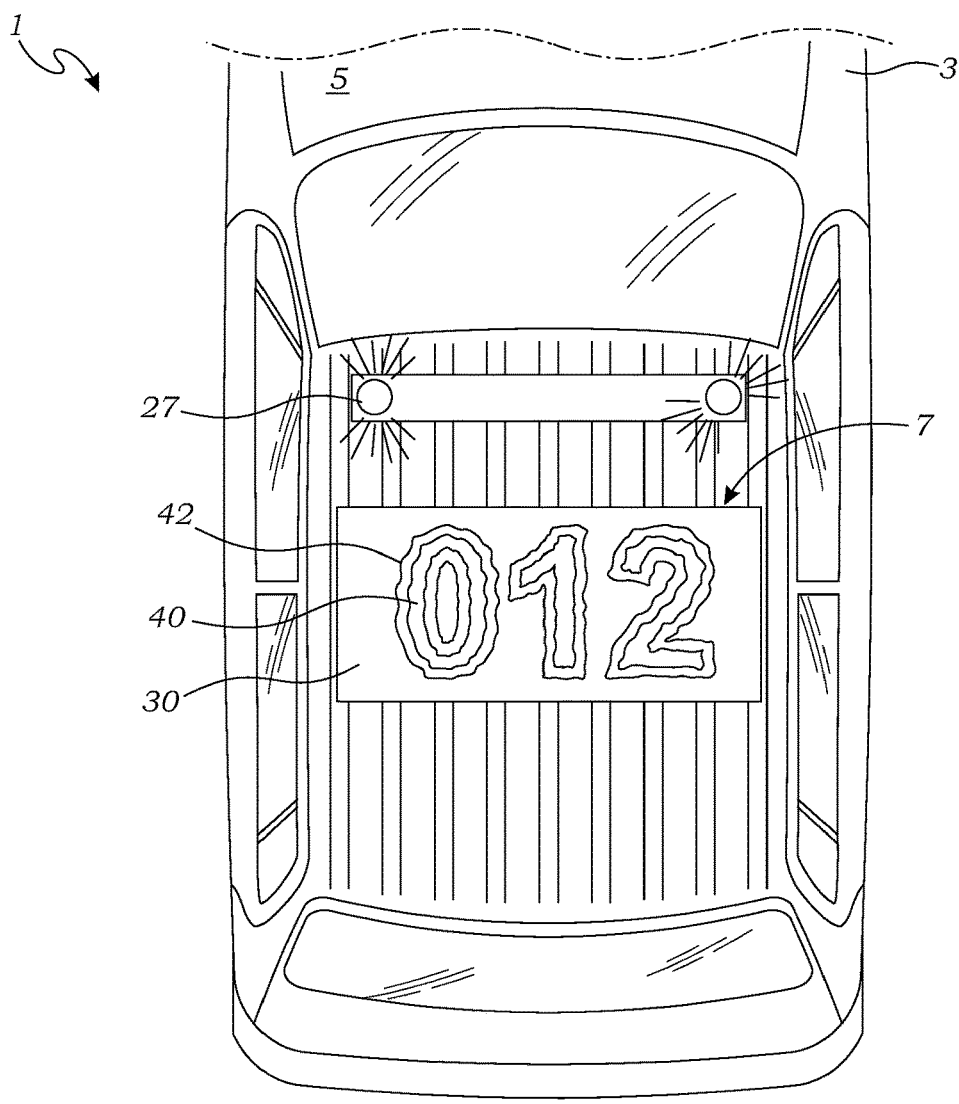
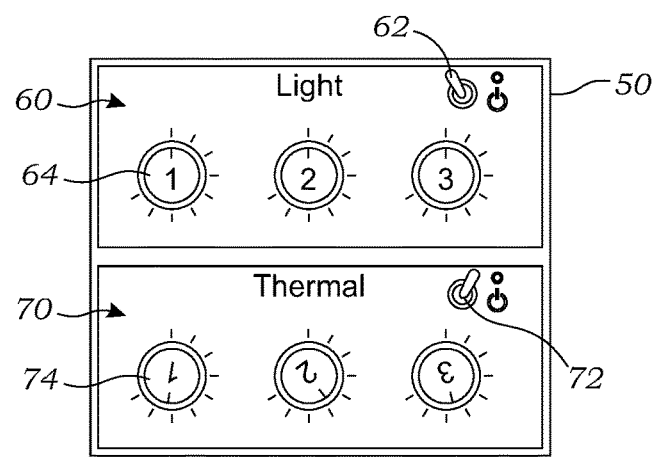
Fig. 15

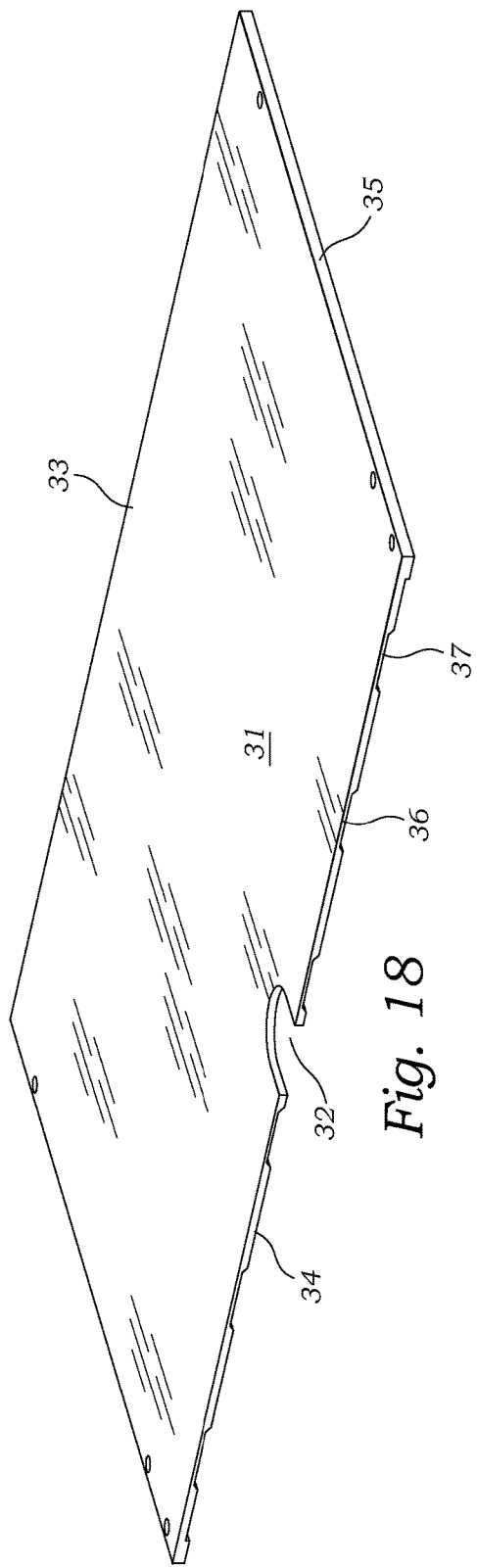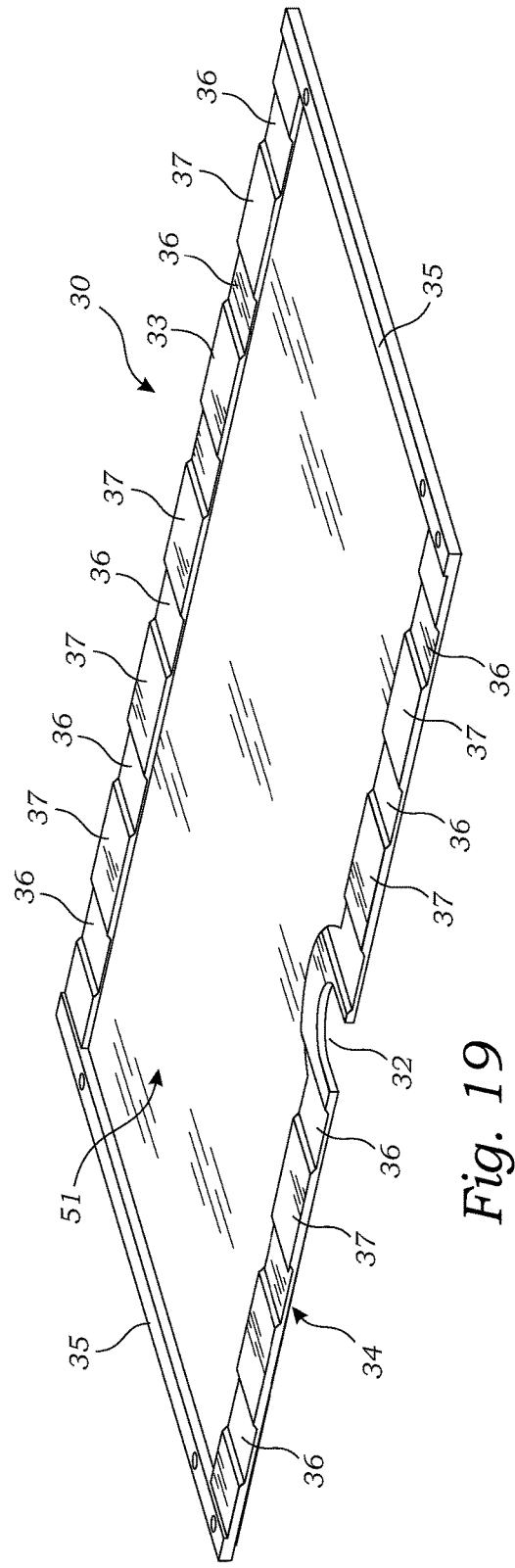

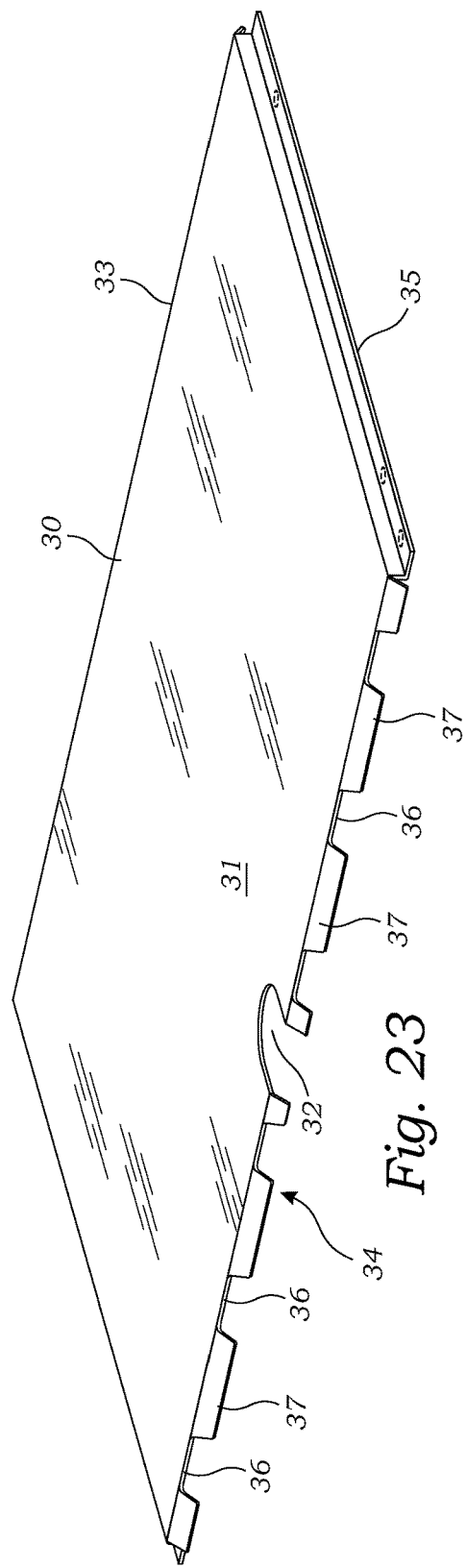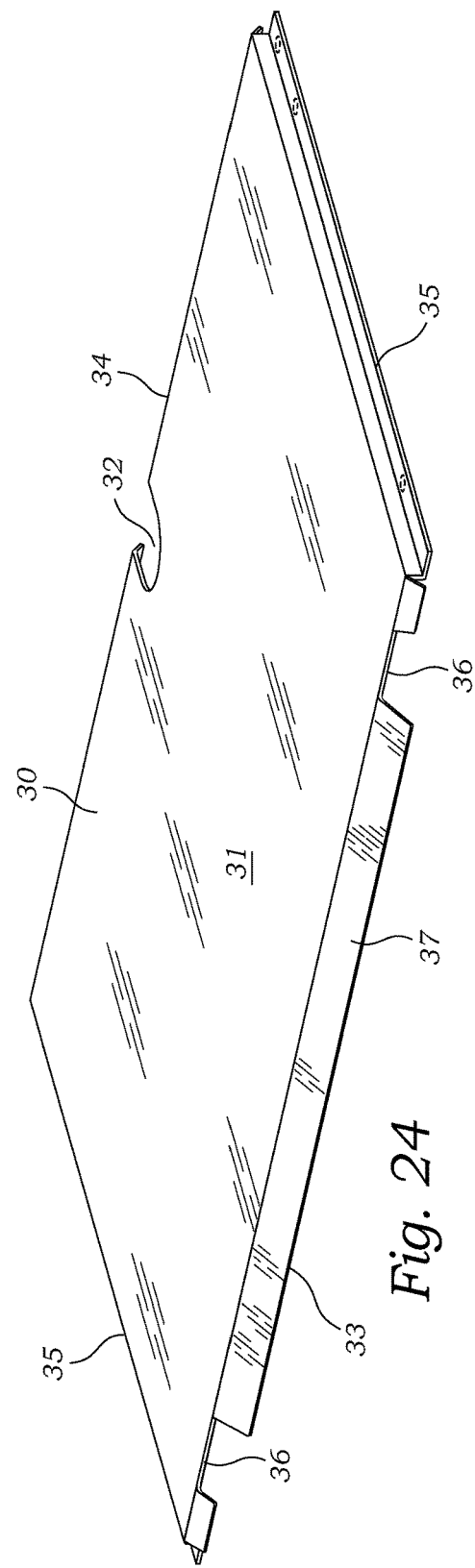

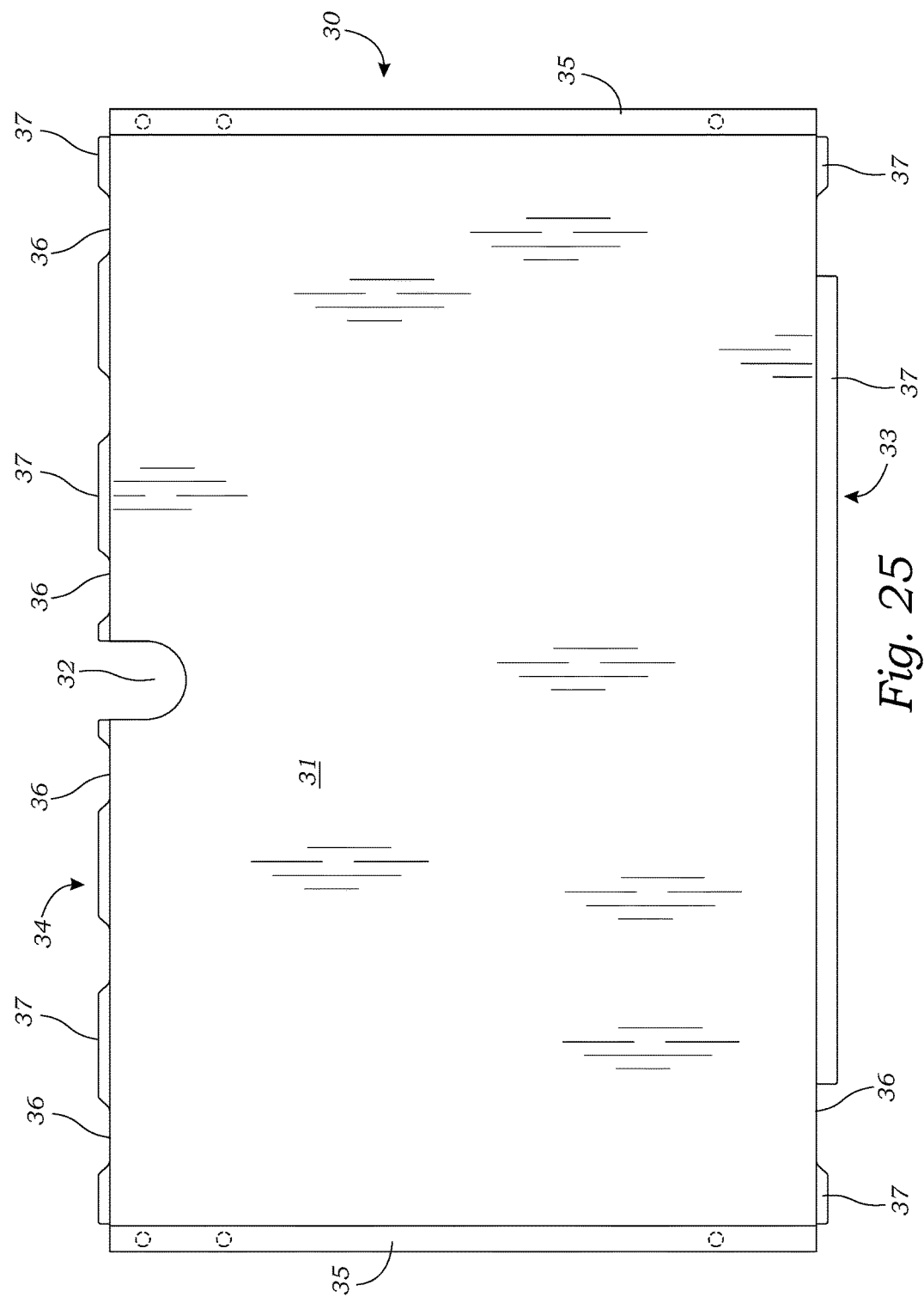

VEHICULAR LIGHT ASSEMBLY WITH LIGHT SENSOR

RELATED APPLICATIONS

The present application is a continuation of U.S. patent application Ser. No. 15/593,817 filed May 12, 2017, which in turn is a continuation of U.S. patent application Ser. No. 14/736,997 filed Jun. 11, 2015, now U.S. Pat. No. 9,656,597 issued May 23, 2017, which in turn is a continuation of U.S. patent application Ser. No. 14/512,171 filed on Oct. 10, 2014, which in turn is a continuation-in-part application of co-pending U.S. patent application Ser. No. 14/070,925 filed on Nov. 4, 2013, which in turn is a continuation-in-part application of co-pending U.S. patent application Ser. No. 13/385,697 filed on Mar. 2, 2012, now U.S. Pat. No. 8,585,263 issued Nov. 19, 2013, which in turn is a continuation-in-part application of U.S. Patent Application Ser. No. 61/464,515 filed on Mar. 4, 2011.

BACKGROUND OF THE INVENTION

The present invention relates to indicia that can be affixed on top of the horizontal planar surfaces of emergency response vehicles such as fire department vehicles, police cars and ambulances to provide visibility from above.

Most conventional emergency response vehicles provide audible alert warnings and visual alert warnings such as sequenced flashing of head, tail and side light assemblies, or a roof mounted light bar containing at least one light source designed to disburse light in 360 degrees. These lights may be solid, stroboscopic, revolving, flashing, modulated, pulsing, oscillating, alternating, or any combination thereof. Thus, these light systems are designed primarily for viewing from the front, rear, or side of emergency response vehicles.

While in most situations, any of the aforementioned devices would suffice in alerting a passerby of the presence of the emergency response vehicle, there are crucial situations in which greater visibility is required. For example, in the case of vehicular pursuits, helicopter units are often called for service to help ground units observe and track pursuits as well as ensure public safety while in pursuit. Helicopters provide valuable service to law enforcement in general and, more particularly, to the pursuit function. Helicopter units can assist ground units as a platform from which to observe, track and illuminate people or places on the ground. Moreover, the helicopter units serve as backup to ground units, and the helicopter flight crews can provide a perspective that cannot be achieved on the ground. Further, they can communicate with ground units and provide information to direct them toward an intended position or away from a dangerous one. In addition, the helicopter units can provide crucial information, such as reporting whether or not suspects are carrying weapons, etc.

There is a need for a system to assist helicopter units in distinguishing ground units and their positioning. Currently, many police vehicles already have numerals illustrated on top of their roofs. These numerals are used to differentiate a police vehicle from other vehicles and to help identify the police district, the unit, and the individual. However, typically, these numerals are in plain black text and are not illuminated. Therefore, when there is little or no light, it can be difficult to distinguish the numbers on top of a police vehicle.

Moreover, even if vehicles were provided with illuminated indicia, it is difficult to maintain consistent illumination as letters and numbers have different surface areas, and thus would have different power requirements to provide consistent illumination.

Therefore, there is a need for better identification of emergency response vehicles for being seen from above.

Furthermore, there is a need for improved power and switching systems to provide 5 consistent illumination to illuminated indicia upon emergency response vehicles.

SUMMARY OF THE INVENTION

The present invention is directed to an illuminating alpha-numeric lighting system for emergency response vehicles that is able to enhance the visibility of emergency response vehicles to those in the air, such as in helicopters.

The illuminated lighting system provides indicia, in the form of illuminated letters or numerals, on the top of the substantially planar surfaces of emergency response vehicles, such as upon the vehicle hoods, cabins and trunks. The size of the indicia may vary depending upon the purpose of the lighting system, and the size of the horizontal surface upon which the indicia is placed. However, preferred letters and numerals have a length greater than one (1) foot and a width greater than one-half (½) foot. More preferably, the letters and numbers have a length of one (1) to five (5) feet and a width of one-half (½) foot to two (2) feet. Still more preferred, the letters and numbers have a length of approximately two (2) feet and a width of one (1) foot.

To provide illumination to the illuminated numerals and letters, power is provided from the vehicle's electrical systems, such as from the vehicle's battery and alternator. The electrical wiring and switching system for the luminescent panels can be developed by those skilled in the art. However, in preferred embodiments the vehicle is provided with a conventional light bar that extends horizontally and laterally above the top of a vehicle. The light bar obtains power from the vehicle's electrical system so as to emit light substantially horizontally, preferably 360 degrees. These lights may be solid, stroboscopic, revolving, flashing, modulated, pulsing, oscillating, and/or alternating. Preferably, additional wiring extends from light bar to the luminescent indicia so that the luminescent indicia obtains power from the light bar. Any AC/DC or DC/AC inverters, or voltage, amperage or wattage converters that supply appropriate power to the luminescent indicia may be located within the light bar housing. Furthermore, a lighting system may include a light sensor for automatically disabling the luminescent panels when daylight, or other ambient lighting, is above a predetermined threshold so as to make the light produced by the luminescent indicia unnecessary. The light sensor may be a simple photocell connected to the wiring connecting the power source to the luminescent indicia wherein the photocell automatically opens the electrical circuit, or variably increases the electrical resistance, to inhibit the supply of power to the luminescent indicia. The light sensor (photocell) may be located anywhere on the vehicle. However, in a preferred embodiment, the light sensor is mounted to the vehicle light bar.

The luminescent numerals and letters may be constructed in various manners. As a first example, the luminescent letters and numbers may be made using a light pipe, also known as a light guide, connected to an independent light source. The light source may be any of various available lighting constructions known in the art. For example, the light source may comprise one or more incandescent light bulbs, light emitting diodes, light emitting crystals, etc. Moreover, the light source may produce light which can be selectively varied in color so as to enable the operator to alter the color of the luminescence. For example, the light source may comprise a plurality of diodes with each diode producing different colored light. Selective activation and deactivation of the diodes alone or in combination will produce illumination in different colors.

The light guide may be constructed in various shapes and of various materials such as of lengths of acrylic plastic, polycarbonate, or glass to form the desired letters or numerals for display from the top of a vehicle. Alternatively, the light pipe may be constructed of one or more fiber optic fibers or cables. The light pipes may also be constructed of one or more different translucent and fluorescent colored materials for projecting light of one or more colors. An acceptable colored material includes "scintillating plastic" which is typically an acrylic plastic incorporating different colored fluorescent dyes. Preferably, the light guide includes a reflecting bottom layer for directing light upwardly so as to be seen from above.

Where the light guide incorporates fiber optic cables, the fiber optic cables are also constructed to project light laterally from their cylindrical exterior as opposed to predominantly from their distal extremities. This can be accomplished by notching, knurling, scratching or in other manners creating flaws in the otherwise smooth exterior cylindrical surface of the fiber optic cable. These flaws have been found to interrupt the transmission of light along the length of the fiber optic cable and to transmit light laterally from the exterior surface of the fiber optic cable, typically opposite the side which has been flawed.

In an additional preferred embodiment of the present invention, the luminescent letters and numbers are constructed of substantially planar electroluminescent (EL) panels. A first EL construction is described in U.S. Pat. No. 5,045,755 issued to Appelberg and assigned to ELite Technologies, Inc. which is incorporated herein by reference. The illuminating sheet is a split electrode or parallel plate lamp consisting of a main body sandwiched between first and second conductive layers. Application of an alternating current to the planar sheet provides a luminescent sheet which is formed in the shape of numerals and letters.

An additional preferred electroluminescent panel for producing the luminescent letters and numbers can be obtained from MKS, Inc. located in Bridgeton, N.J., USA under the trademark designation Quantaflex™. The Quantaflex™ material is an electroluminescent lamp including luminescent phosphors embedded in the dielectric medium of a capacitor constructed in the form of a sheet. Electrodes, including at least one translucent electrode, form the top and bottom layers of the Quantaflex™ material. Upon application of an alternating current to the electrodes, the phosphors give off photons producing light in the visible spectrum of light. An advantage of the Quantaflex™ material is that the phosphors can be selectively encapsulated between the electrode layers of the luminescent sheet so as to selectively produce patterns of light emitted from the luminescent sheet.

In still additional preferred embodiments, the luminescent numbers and letters are constructed of one of the rapidly developing technologies directed to Organic Light Emitting Devices (OLED), Transparent Organic Light Emitting Devices (TOLED), or Flexible Organic Light Emitting Devices (FOLED). Descriptions of these technologies are available to those skilled in the art and need not be described in further detail herein.

In still an additional embodiment illustrated, the luminescent letters and numerals are provided by a panel including dozens or hundreds of rows and columns of LEDs or the like which can be selectably illuminated to form a desired indicia. For this embodiment, it is preferred that the LEDs are connected by wires to a controllable switching system, which in turn is connected to a computer processor or the like. The computer processor, in turn, includes an input device such as a keyboard or control panel to allow controlled independent illumination of selected LEDs to form the desired indicia. Though more expensive and requiring more complicated wiring and processing capabilities to select appropriate illumination to display desired characters, this embodiment allows for the indicia to be rapidly changed as desired.

In a preferred embodiment, the LEDs may produce only infrared light not visible to the human eye and thus only visible through imaging systems such as night vision goggles. Alternatively, infrared light (not visible to the human eye) is produced by introducing a voltage through an electrically resistant material, such as a silver or copper alloy, in the form of the indicia. As but an example, a silver material may be printed to form an elongate electrical circuit upon the substrate material adjacent to the illuminated portion of the electroluminescent portion to provide an invisible light producing section adjacent to the electroluminescent visible light producing section. These non-visible light producing embodiments are advantageous when visible light is not desirable which might alert criminals that law enforcement personnel are approaching, but such law enforcement personnel have imaging systems capable of seeing the non-visible indicia of their comrades' vehicles.

Preferably, the planar luminescent panels in the form of letters and numbers are protected by a protective coating in the form of a laminate sheet. Because the preferred luminescent letters and numerals produce light in both infrared and visible light spectrums, it is preferred that the protective coating allow most of these spectrums of light to pass. However, it is preferred that the protective coating block ultraviolet light which can be harmful to the various electronics such as LEDs or electroluminescent panels. In a preferred embodiment, the protective coating blocks at least 60% of ultraviolet light below 350 nanometers, but allows at least 80% of both visible and infrared light above 450 nanometers. An even more preferred protective coating blocks at least 90% of ultraviolet light below 350 nanometers, but allows at least 85% of visible and infrared light above 500 nanometers.

In the event that the planar luminescent panel produces non-visible infrared indicia produced by heat, it is preferred that the planar luminescent sheet include an insulator layer positioned under the infrared producing layer so as to prevent heat from dissipating into the vehicle's metal surface. In a preferred embodiment, the insulator layer includes a pre-applied adhesive for applying the planar luminescent sheet(s) to a vehicle.

Preferably, a controller in the form of a switching system or computer processor is provided to allow operators to control the operation of the illuminated indicia. Even more preferably, the switching system can selectively strobe the illuminated indicia. In still an additional embodiment, the switching system includes manual or automatic variable resistors for controlling the wattage provided to each illuminated indicia so that the wattage may be varied between each illuminated indicia.

Advantageously, the controller can selectively control the planar light panel to produce infrared light above 760 nanometers, while not producing substantial visible light below 600 nanometers so as to be substantially invisible to the human eye with the protective coating allowing at least 80% transmission of the infrared light through the protective coating. Still an additional advantage of the present invention is that the controller allows the planer light panel to produce only visible light between 400 nanometers and 760 nanometers, or simultaneously produce both visible light between 400 nanometers and 760 nanometers and infrared light above 760 nanometers.

Advantageously, the luminescent numerals and letters may be adhered directly to the roof or top of an emergency response vehicle. However, in an alternative embodiment, a rectangular frame is provided for affixing the luminescent panels to the top of the roof of emergency response vehicles. In still an additional embodiment, a planar roof plate is provided which affixes to the vehicle manufacturer's preexisting female threads formed into the roof of the vehicle which are typically used for mounting a roof rack. Where the vehicle has a corrugated roof forming a plurality of troughs and ridges, preferably the roof plate has a top surface that is substantially planar and a bottom surface that includes a plurality of channels forming elongate teeth positioned and aligned to project into the vehicle's roof's troughs. The roof plate engages and is affixed to the vehicle roof with the roof plate's teeth extending into the vehicle roof trough so as to provide better aerodynamics and to provide better support for items mounted to the plate's upper surface. Indicia, antenna, or light bars may be mounted to the roof plate's top surface.

In a preferred embodiment, the planar roof plate has a top wall including the top surface, two sidewalls, a front wall and a rear wall. Small holes, ports or slots may be drilled or formed into the top wall, left and right sidewalls, or front and rear walls for the routing of electrical wiring. However, it is preferred that the two sidewalls, front wall and rear wall are sized and constructed to engage the vehicle roof substantially along their lengths to form a central cavity between the vehicle roof and top wall. Where the vehicle roof is not corrugated but instead relatively smooth, it is preferred that the planar roof plate's front and rear walls also be relatively smooth to conform and engage the vehicle's top surface. However, where the vehicle has a corrugated roof forming a plurality of troughs and ridges, preferably the roof plate front wall and/or rear wall includes channels forming elongate teeth positioned and aligned to project into the vehicle's roof's troughs. It is preferred that any wiring to a light bar or luminescent indicia upon the roof plate be located in the central cavity for the protection of the wiring and to reduce aerodynamic drag that might be produced by the wiring.

Once mounted directly to the roof of a vehicle or upon the planar roof plate, the illuminated numerals and letters are easily visible to those in the air.

Thus, it is an additional object of the invention to provide a structure for identifying emergency response vehicles from the air, such as by those in planes and helicopters.

Further, it is an object of the present invention to provide an improved vehicular external lighting system capable of operating with a low current draw and able to be simply integrated into an existing vehicle's electrical system.

These and other more specific objects and advantages of the invention will be apparent to those skilled in the art from the following detailed description taken in conjunction with the drawings.

BRIEF DESCRIPTION OF THE DRAWINGS

FIG. 14 is a top plan view of the luminescent panels, planar plate, vehicle, and controller of FIG. 13 wherein the controller has activated and adjusted the wattage provided to the electroluminescent indicia;

FIG. 15 is a top plan view of the luminescent panels, planar plate, vehicle, and controller of FIG. 13 wherein the controller has activated and adjusted the wattage provided to the infrared/thermal indicia;

FIG. 18 is a top, right, rear perspective view of a second embodiment of the vehicular roof plate;

FIG. 19 is a bottom, left, rear perspective view of the second embodiment of the vehicle roof plate;

FIG. 23 is a top, right, rear perspective view of a third embodiment of the vehicular roof plate;

FIG. 24 is a top, left, front perspective view of the third embodiment of the vehicle roof plate;

FIG. 25 is a top plan view of the third embodiment of the vehicle roof plate;

DETAILED DESCRIPTION OF THE INVENTION

Figure 1:
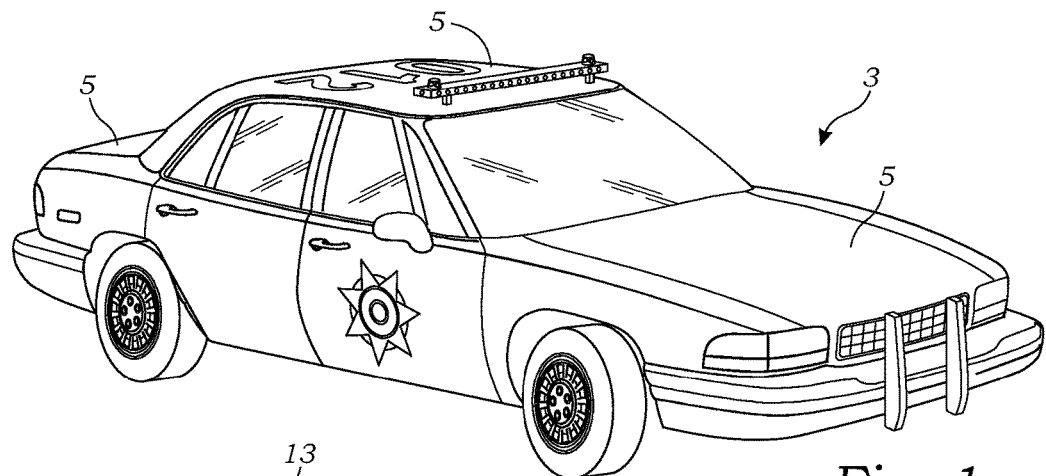
FIG. 1 is a perspective view of an emergency response vehicle equipped with illuminated indicia affixed on top of the roof.

While the present invention is susceptible of embodiment in various forms, as shown in the drawings, hereinafter will be described the presently preferred embodiment of the invention with the understanding that the present disclosure is to be considered as an exemplification of the invention, and it is not intended to limit the invention to the specific embodiments illustrated.

With reference to FIGS. 1-29, the present invention is a vehicular illuminated sign 1. The vehicular illuminated sign comprises two primary components including the vehicle 3 and luminescent planar sheet 7. The terms "vehicle" and "luminescent planar sheet" are to be interpreted broadly as to encompass a wide variety of embodiments as would be understood by those skilled in the art. For example, the vehicle 3 is any wheeled vehicle for travel upon the roads and highway of this country including automobiles, trucks, vans, etc. The present invention is intended primarily for emergency response vehicles. However, the invention may have application for identifying trucking fleets and the like. Each of these vehicles have substantially horizontal planar surfaces 5, such as the hood, cabin top, and trunk illustrated in FIGS. 6 and 7.

The luminescent planar sheet 7 of the present invention is mounted upon one or more of the vehicle's horizontal planar surfaces 5. The luminescent planar sheet 7 is mounted substantially horizontally so as to display indicia 9 upwardly, and thus emit light in a direction perpendicular to the vehicle's horizontal planar surface 5. The indicia 9 is in the form of one or more alpha-numeric characters having a length (commonly referred to as a height) and a width. The alpha-numeric characters are provided to identify a vehicle, and thus are preferably unique to that vehicle. The alpha-numeric characters may have any height or width as necessary so as to identify the vehicle from the air. However, the alpha-numeric characters preferably have a length greater than 1 ft. and a width greater than ½ ft. Still more preferably, each of these numbers or letters forming the indicia has a length of approximately 2 ft. and a width of 1 ft.

The luminescent planar sheets may be constructed to produce light in various colors, and may switch between different colors. In still an additional embodiment of the present invention, the luminescent planar sheet may be constructed to produce light which is primarily invisible to the human eye such as in the infrared spectrum. The term "primarily invisible to the human eye" is intended to be interpreted broadly because traditional light sources producing light in the infrared spectrum, including heat producing systems, will often produce a minimal amount of light in the visible spectrum. However, as understood by those skilled in the art, such infrared/thermal light sources are highly visible when wearing night vision goggles or the like.

The luminescent planar sheet is connected to a power system mounted within the vehicle. The power system may be in the form of a battery separate from the vehicle's traditional battery mounted under the hood. However, preferably the illuminated vehicular sign utilizes the power system already provided in a vehicle including the battery and alternator. To control the power to the luminescent planar sheet 7, preferably one or more switches are positioned within the vehicle's cabin so as to control the on or off illumination of the sign. Further, switches may be provided to control the brightness of the illumination and/or color being illuminated. For example, the signage may change colors so as to indicate different events. For example, the luminescent planar sheet may be made to illuminate red in the event of an emergency. Alternatively, the luminescent planar sheet may be made to strobe in the event of an emergency. Switching systems for providing these features can be easily deduced by those skilled in the art and are not described further herein.

Figure 2:
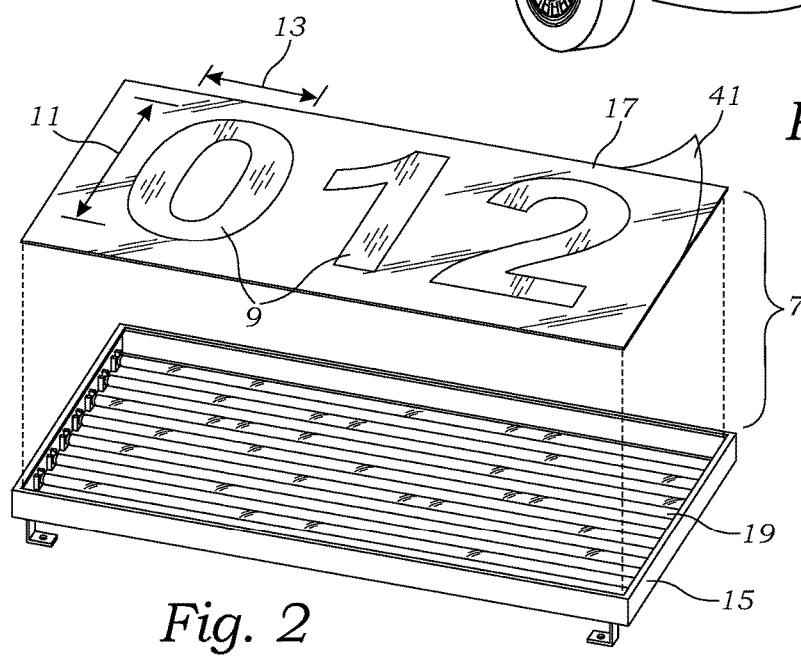
FIG. 2 is a top-exploded view of a frame possessing luminescent panels of the present invention.
Figure 3:
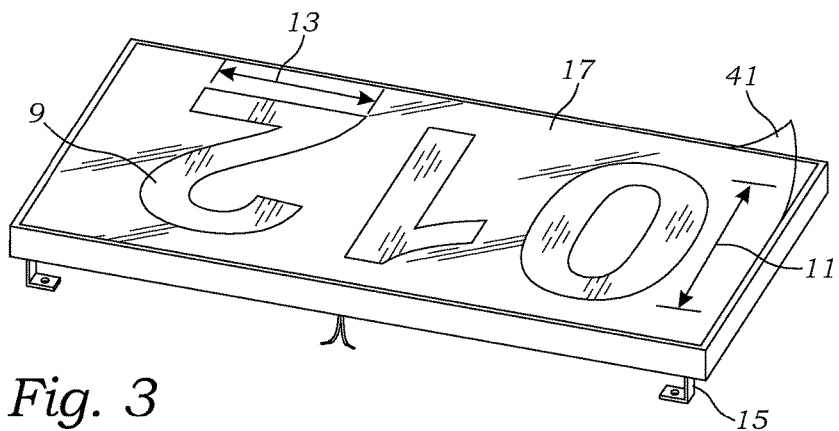
FIG. 3 is a top view of a frame possessing luminescent panels of the present invention.
Figure 4:
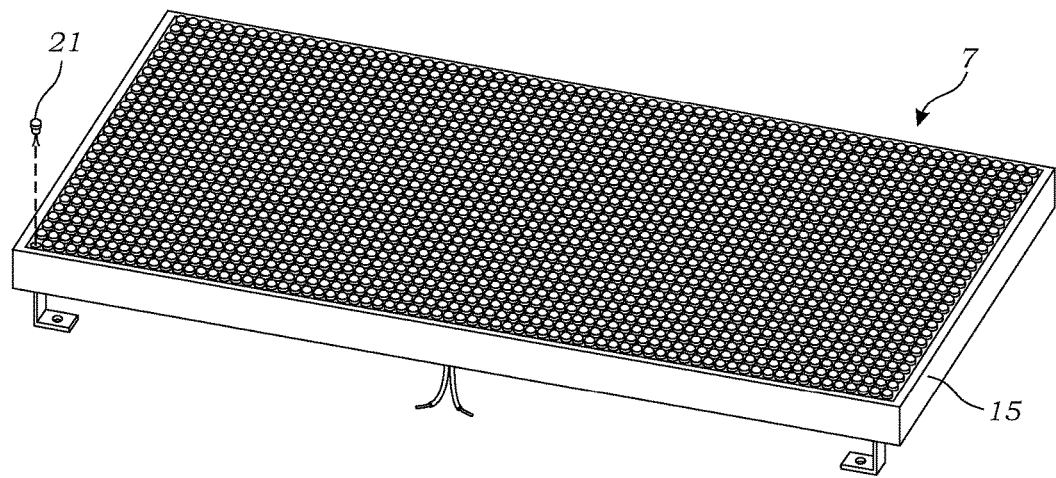
FIG. 4 is a top view of a frame possessing luminescent panels of the present invention possessing LED's.
Figure 5:
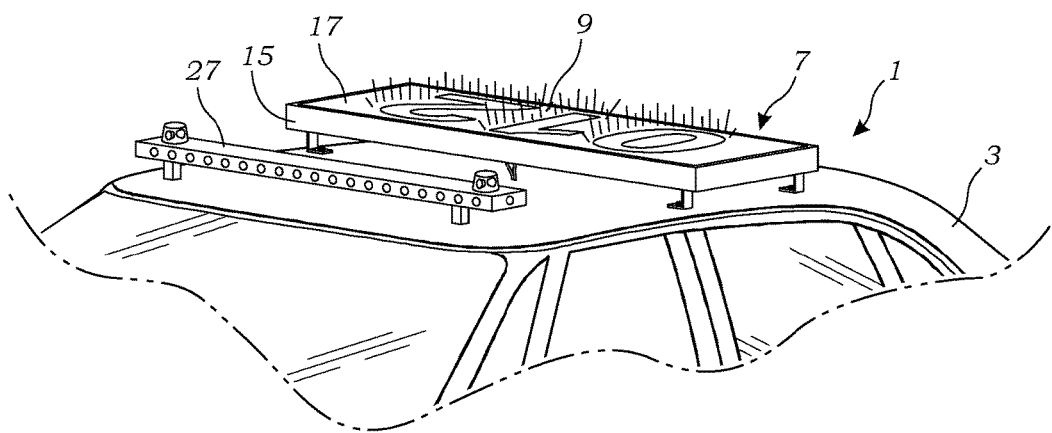
FIG. 5 is a front perspective view of the present invention.
Figure 6:
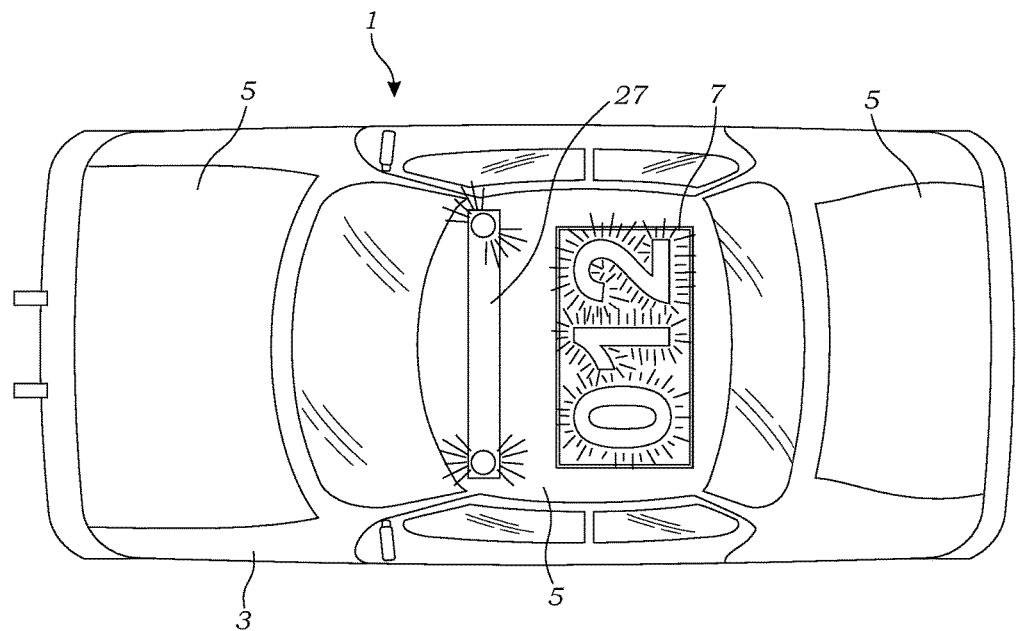
FIG. 6 is a top elevation view of the present invention.
Figure 7:
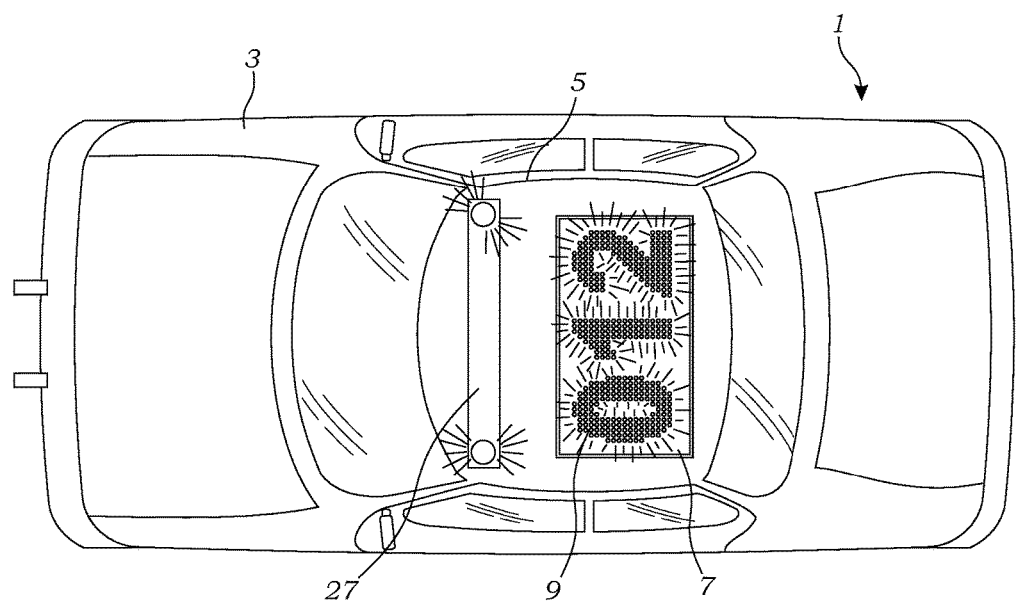
FIG. 7 is a top elevation view of an alternative embodiment of the present invention.

As illustrated in FIGS. 2-10, the luminescent planar sheet may be constructed in various manners. As illustrated in FIGS. 2 and 3, in a first embodiment, the luminescent planar sheet comprises a light pipe 17 and an independent light source in the form of fluorescent bulbs. The light pipe may be made to create opaque alpha-numeric characters with luminescent borders around the alpha-numeric characters. Alternatively, the luminescent planar sheet may be made to create luminescent alpha-numeric characters and an opaque border so as to identify such characters. As illustrated in FIGS. 4 and 5, the luminescent planar sheet may comprise a plurality of LEDs forming the light source which is again covered by a light pipe 17. Again, as illustrated in FIGS. 6 and 7, the indicia may be made to illuminate with an opaque border. Alternatively, the illuminated planar sheet may be made to have opaque indicia with an illuminated border. Where LEDs are employed, the switches controlling activation of the LEDs may be controlled by a computer processor as to form different indicia as desired.

Figure 8:
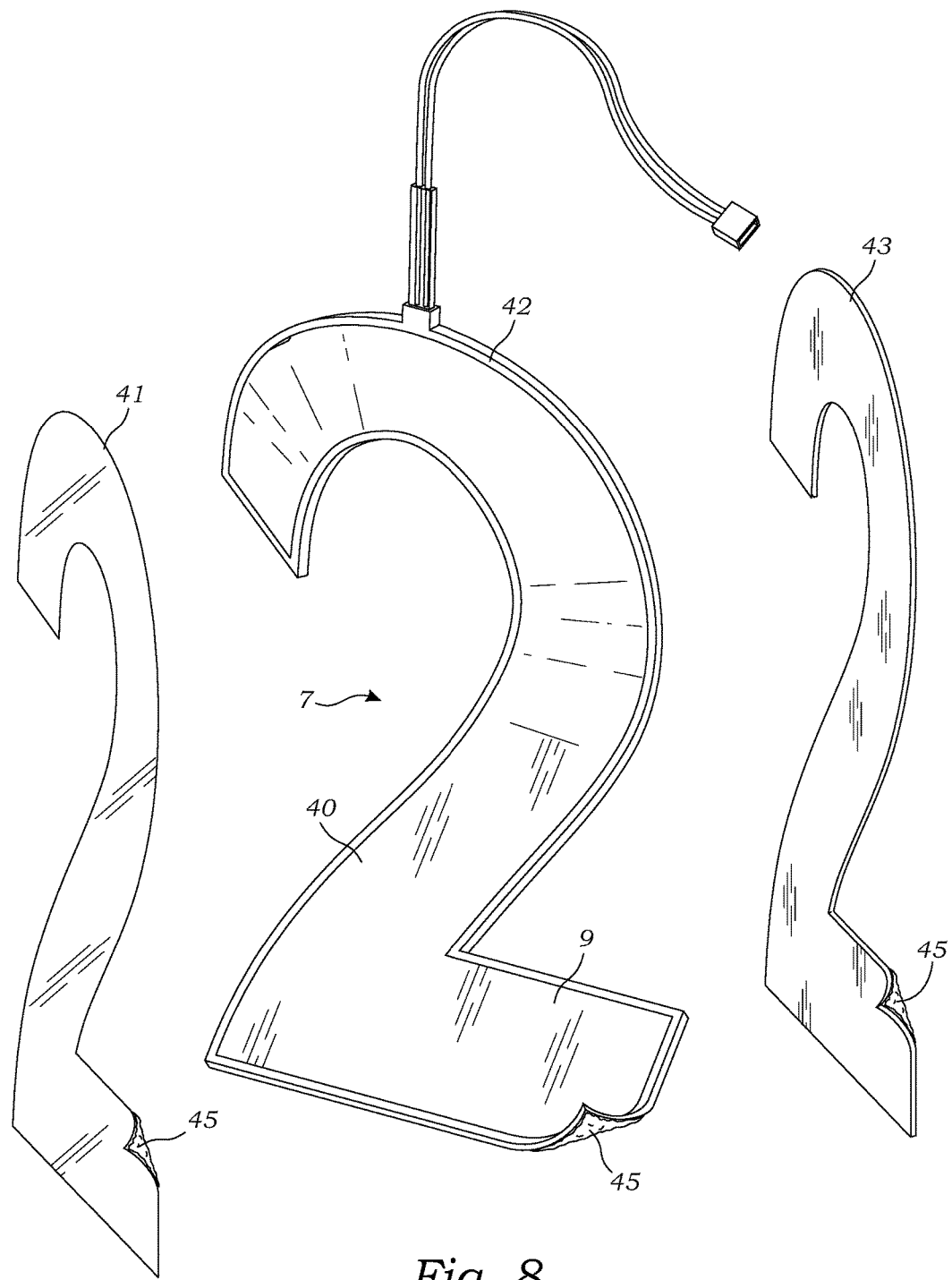
FIG. 8 is a perspective view of illuminated indicia in the form of an electroluminescent panel.
Figure 9:
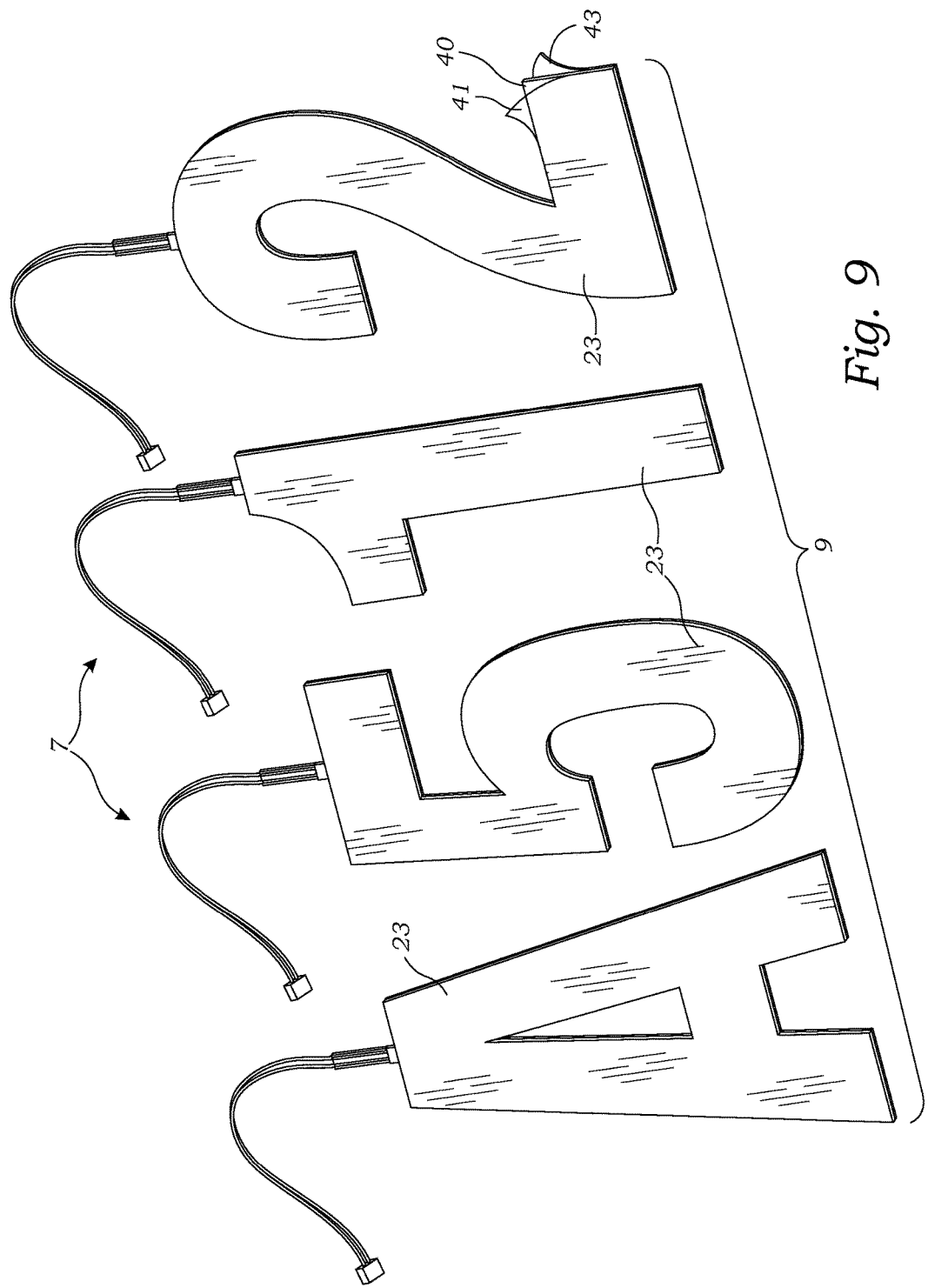
FIG. 9 is a perspective view of illuminated indicia in the form of four electroluminescent panels for identifying an emergency response vehicle.
Figure 10:
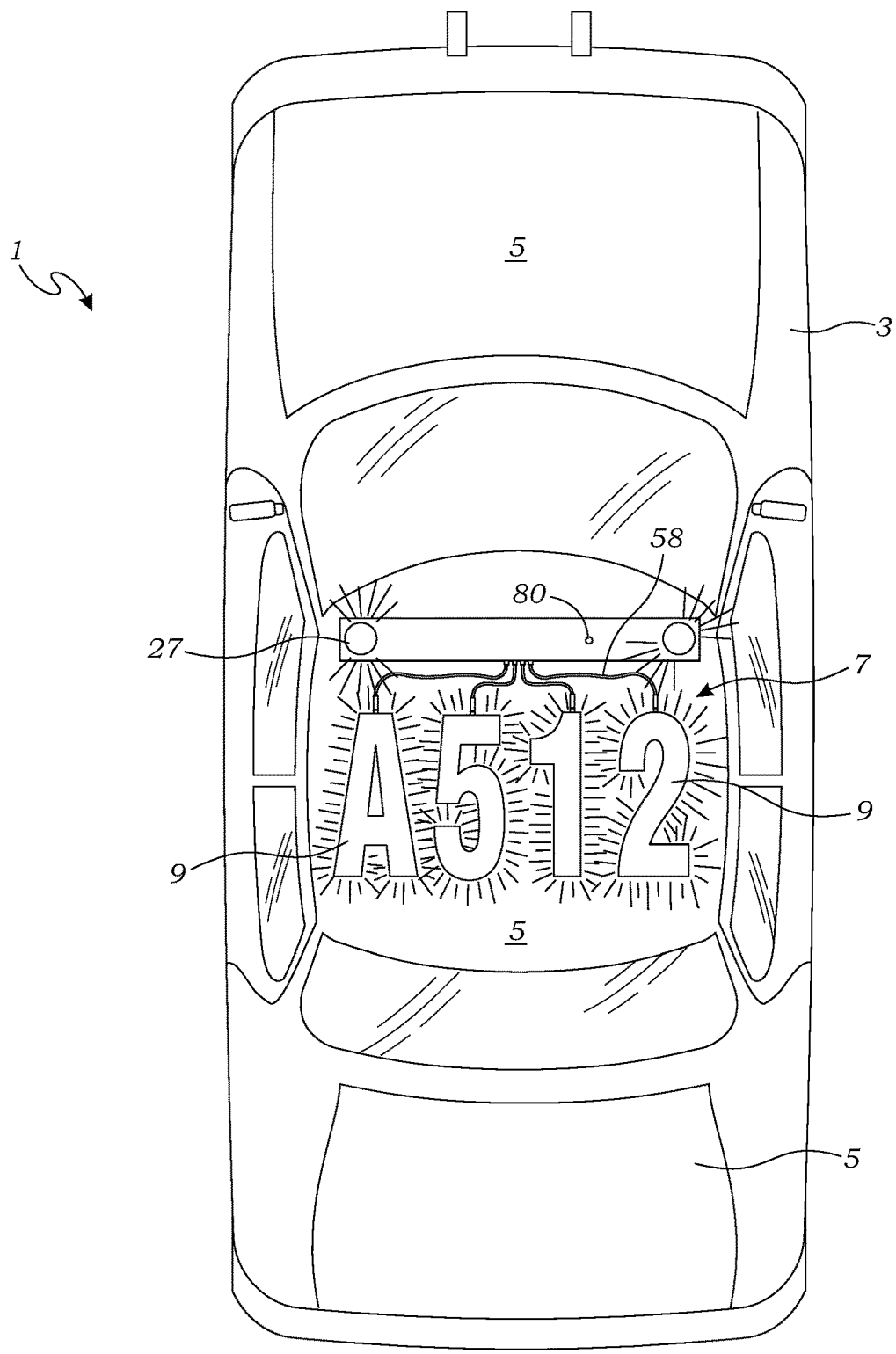
FIG. 10 is a top plan view of illuminated indicia in the form of four electroluminescent panels for identifying an emergency response vehicle.
Figure 11:
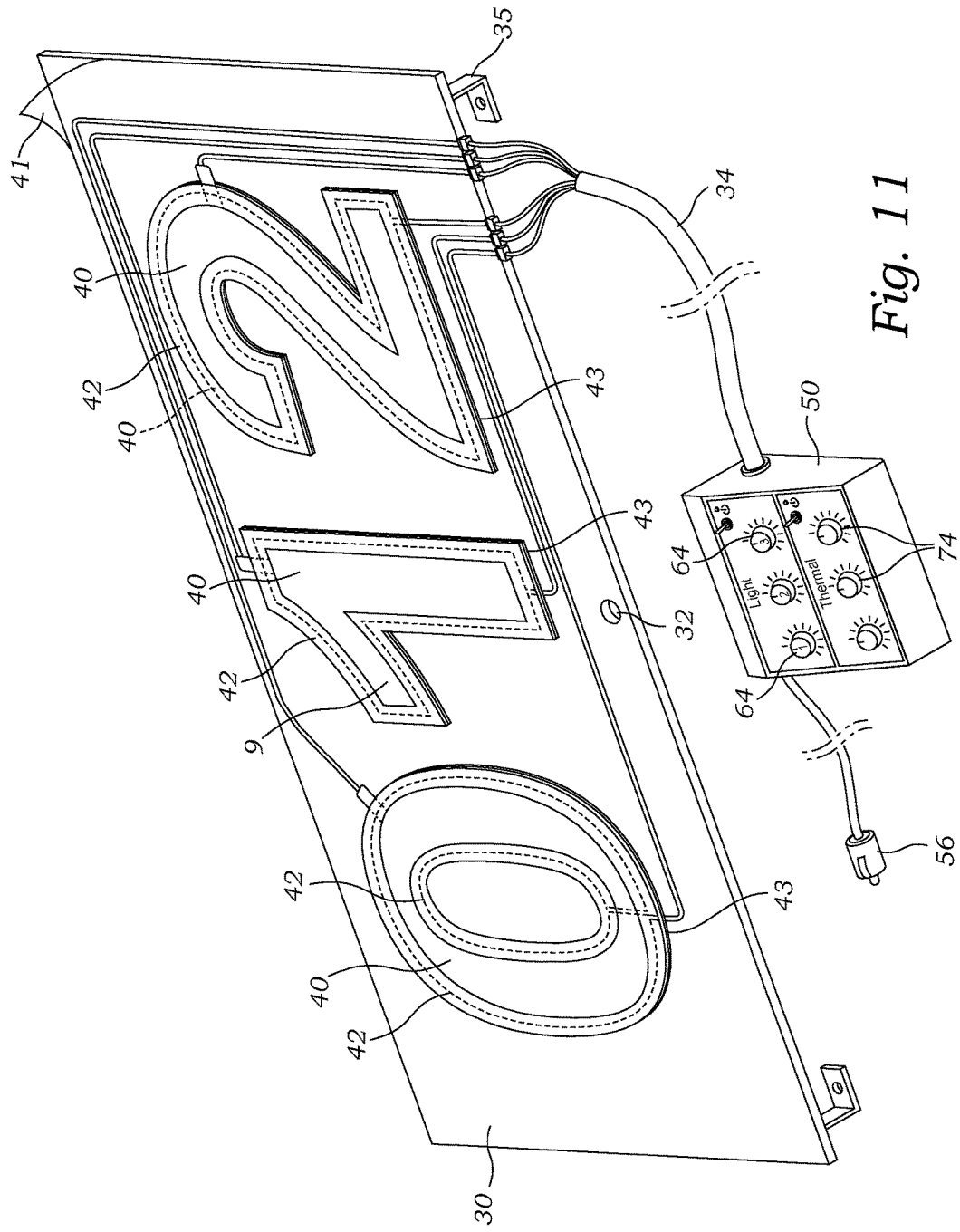
FIG. 11 is a top perspective view of illuminated indicia in the form of three luminescent panels connected to a controller for activating and controlling the amount of wattage provided to electroluminescent indicia and for activating and controlling the amount of wattage provided to infrared/thermal indicia.
Figure 12:
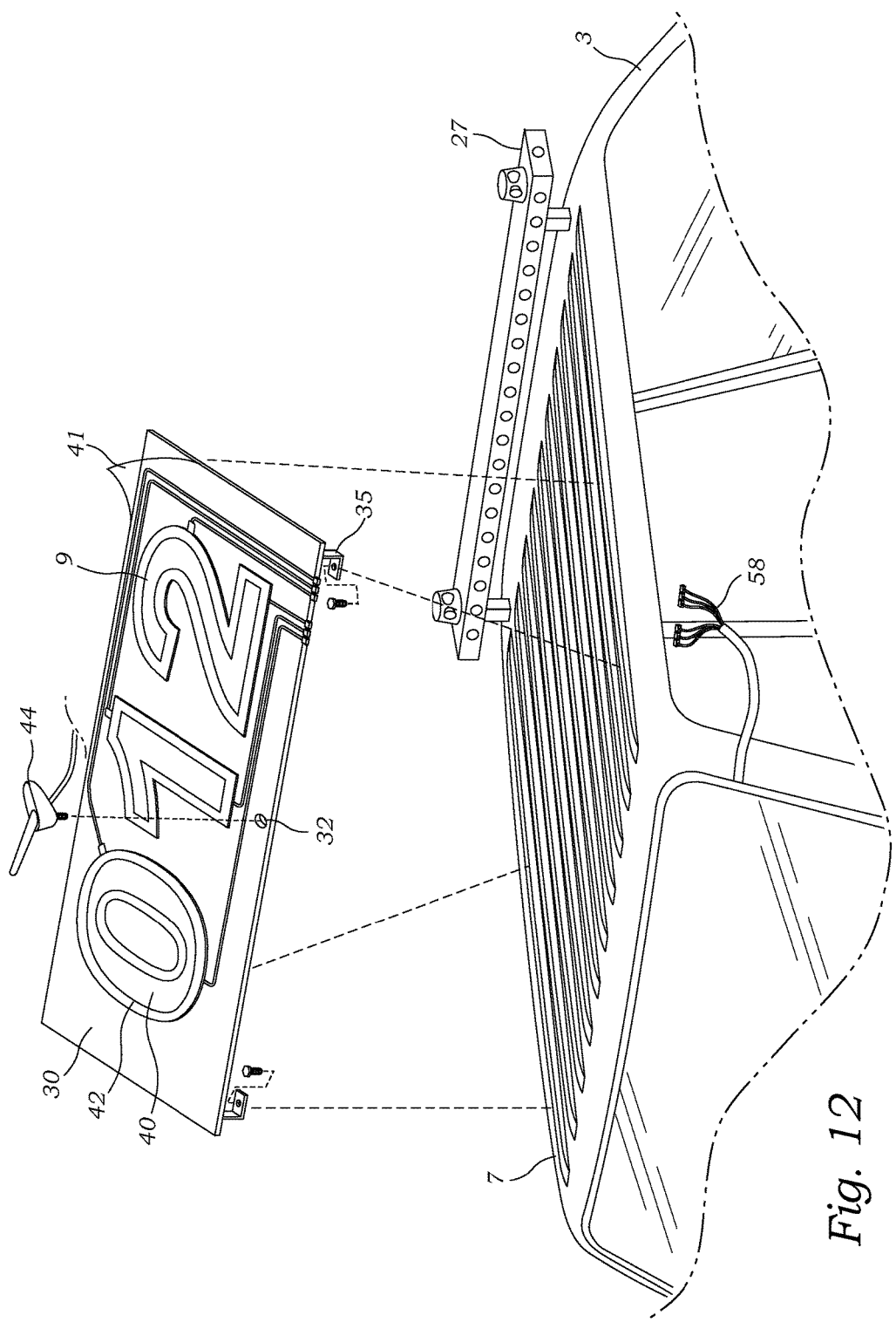
FIG. 12 is a perspective view of illuminated indicia in the form of three luminescent panels and a radio frequency antennae affixed to a planar plate constructed to be mounted upon the corrugated roof of a vehicle.
Figure 13:
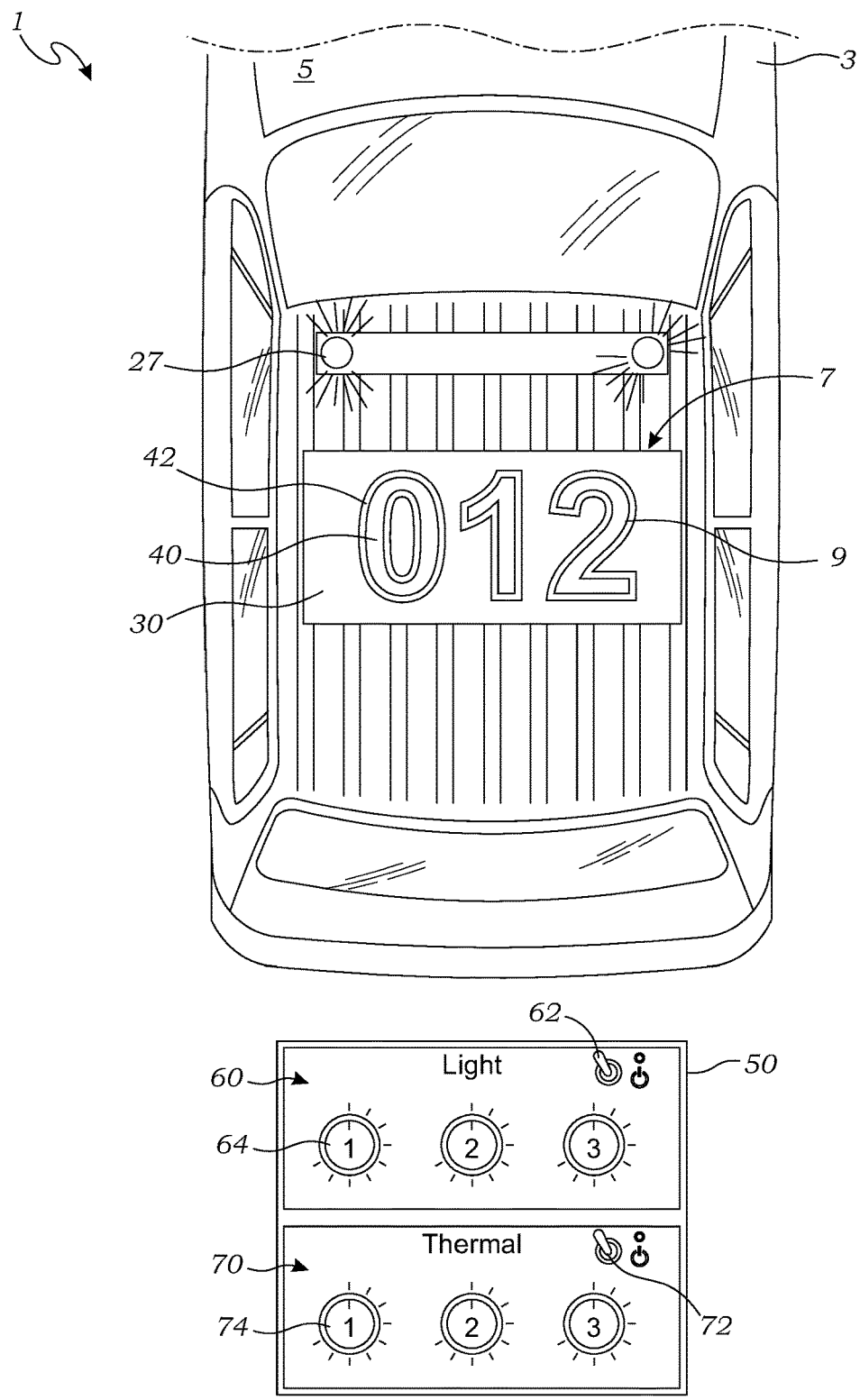
FIG. 13 is a top plan view of illuminated indicia in the form of three luminescent panels affixed to a planar plate which in-turn is mounted upon the corrugated roof of a vehicle, and illustrating a controller for activating and controlling the amount of wattage provided to electroluminescent indicia and for activating and controlling the amount of wattage provided to infrared/thermal indicia.
Figure 16:
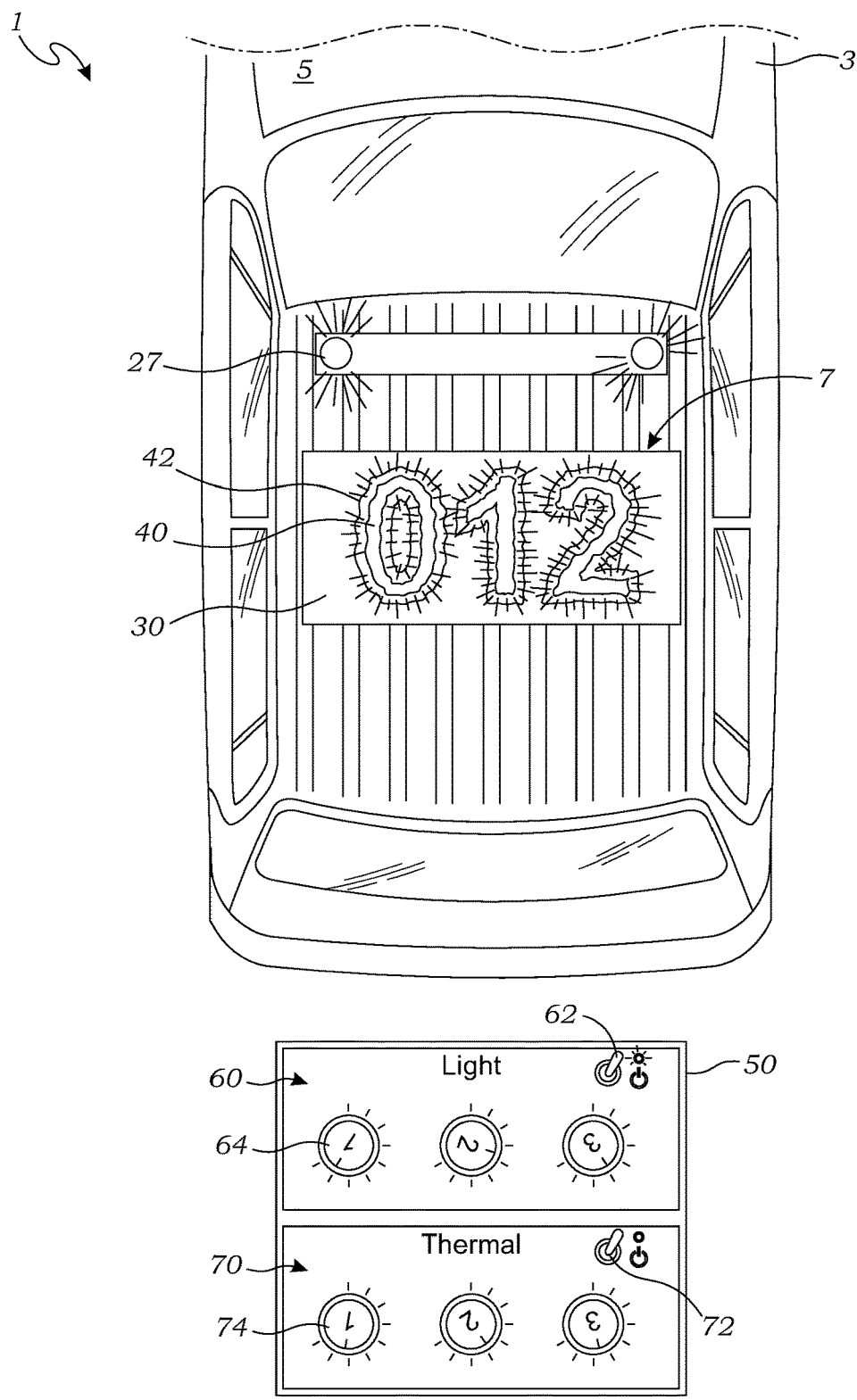
FIG. 16 is a top plan view of the luminescent panels, planar plate, vehicle, and controller of FIG. 13 wherein the controller has activated and adjusted the wattage provided to the infrared/thermal indicia, and the controller has activated and adjusted the wattage provided to the electroluminescent indicia.
Figure 17:
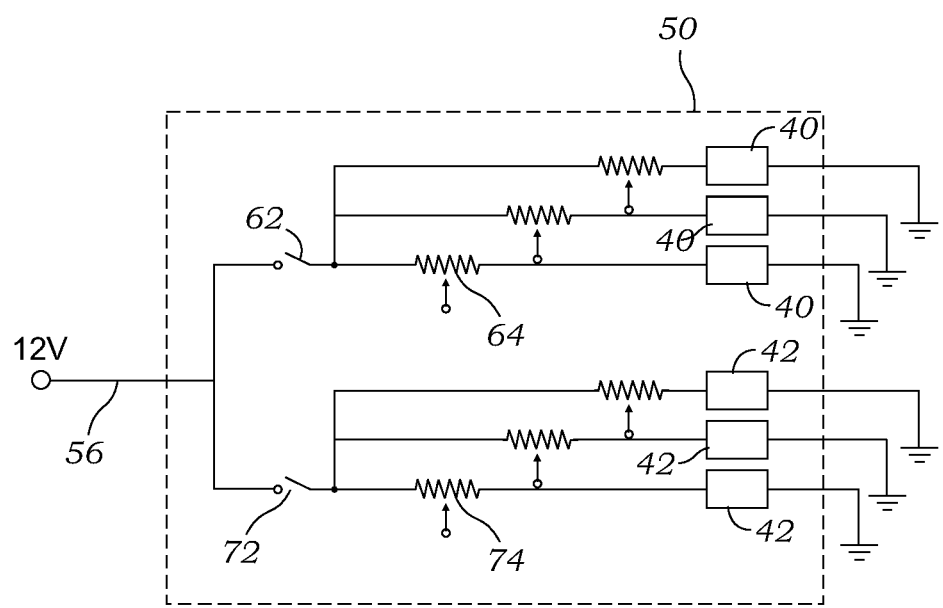
FIG. 17 is a simplified electrical diagram illustrating the switching system including 20 adjustable variable resistors to adjust the wattage provided to each infrared/thermal indicia and to each electroluminescent indicia.
Figure 20:
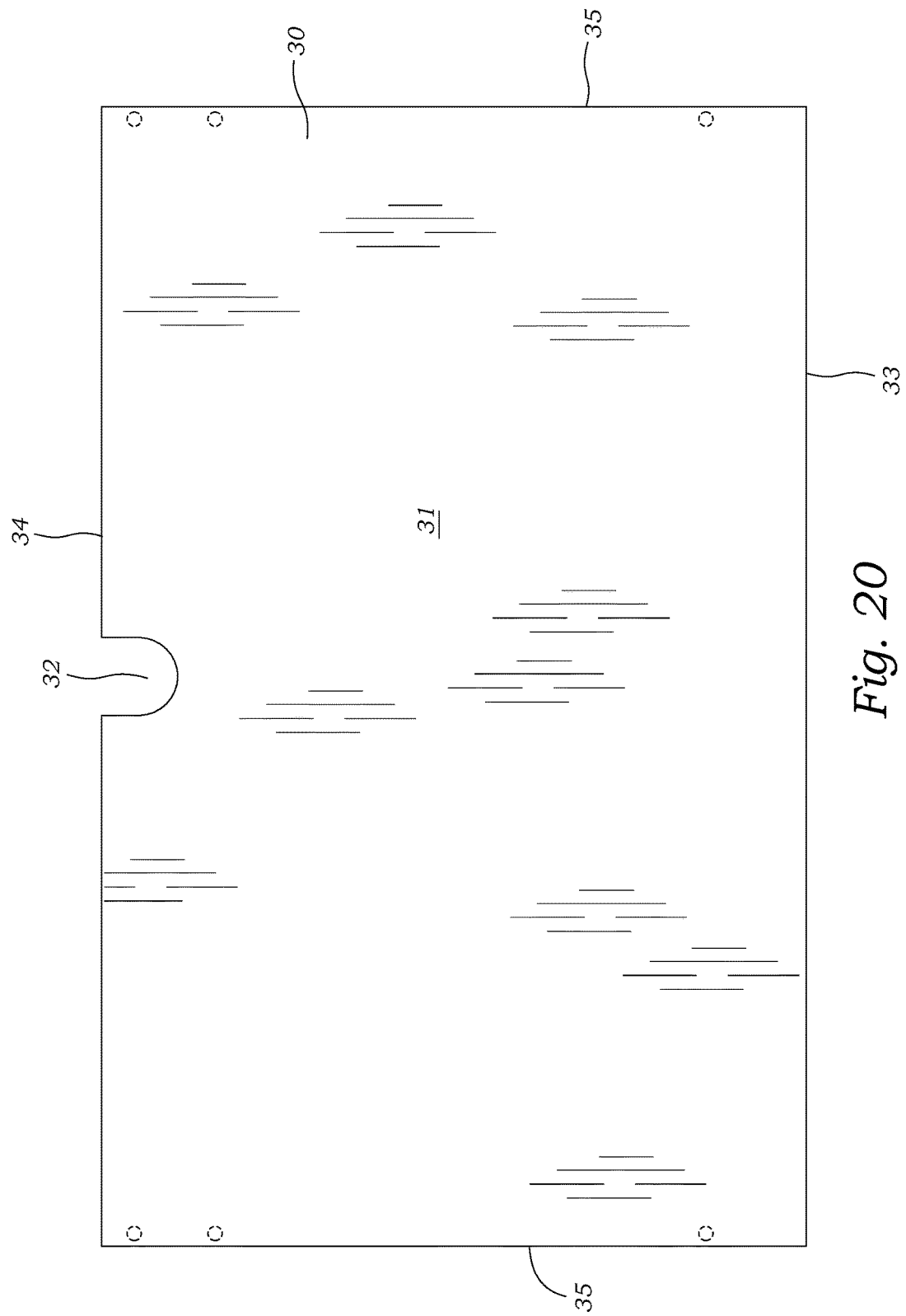
FIG. 20 is a top plan view of the second embodiment of the vehicle roof plate.
Figure 21:
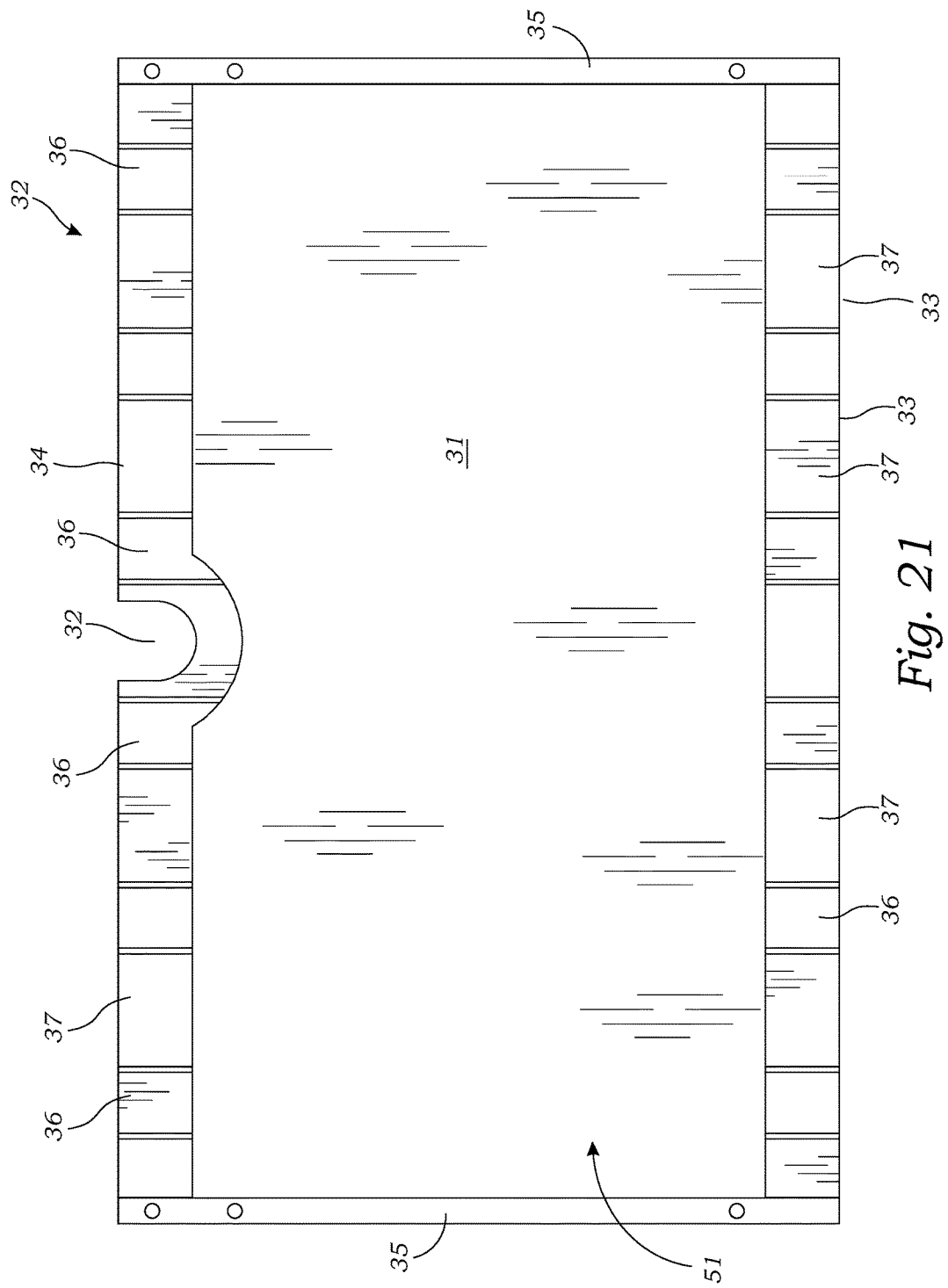
FIG. 21 is a bottom plan view of the second embodiment of the vehicle roof plate.
Figure 22:
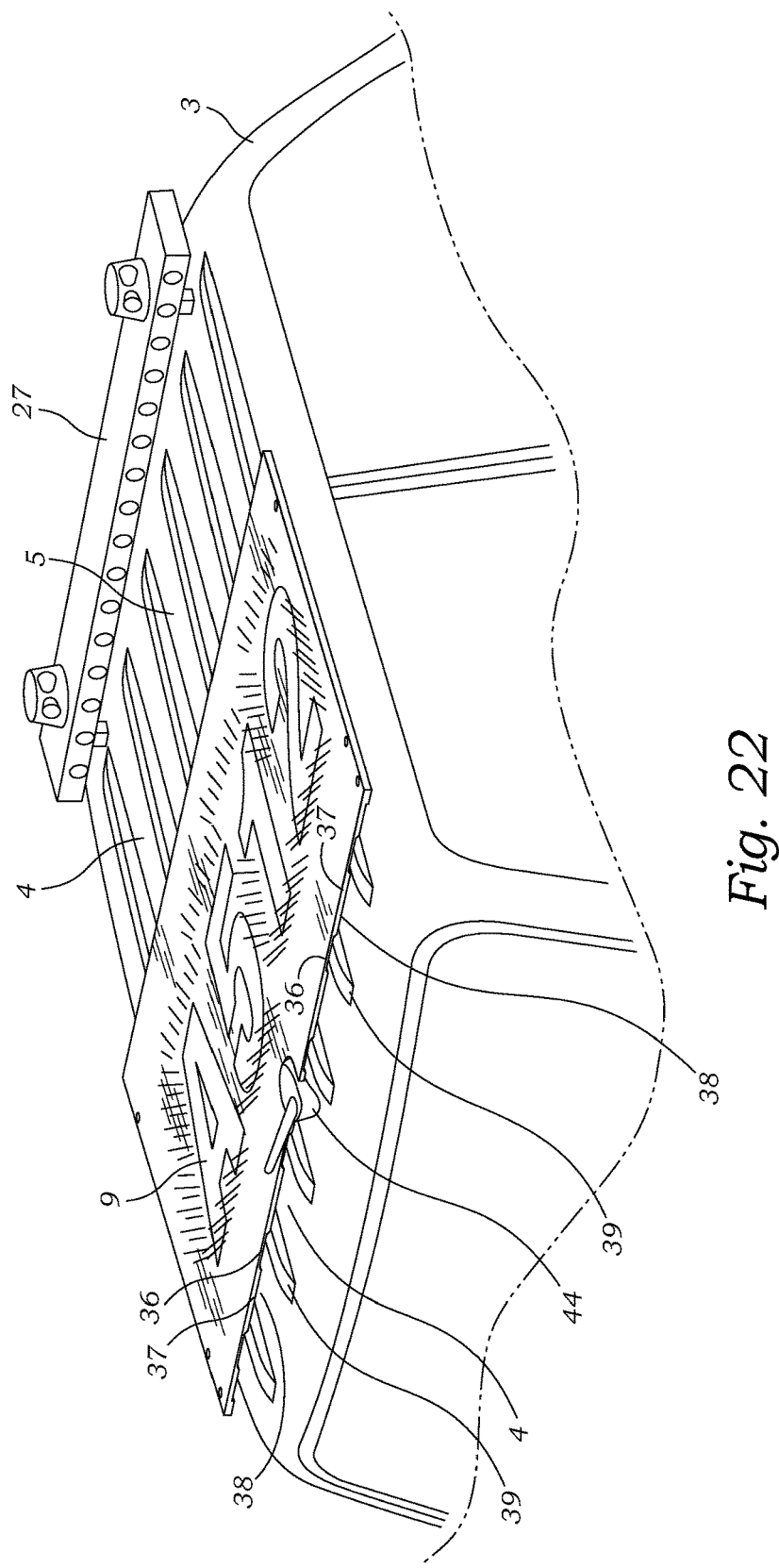
FIG. 22 is a top perspective view illustrating the second embodiment of the vehicular roof plate supporting emergency response vehicle identification characters and affixed to the corrugated roof of a vehicle.
Figure 26:
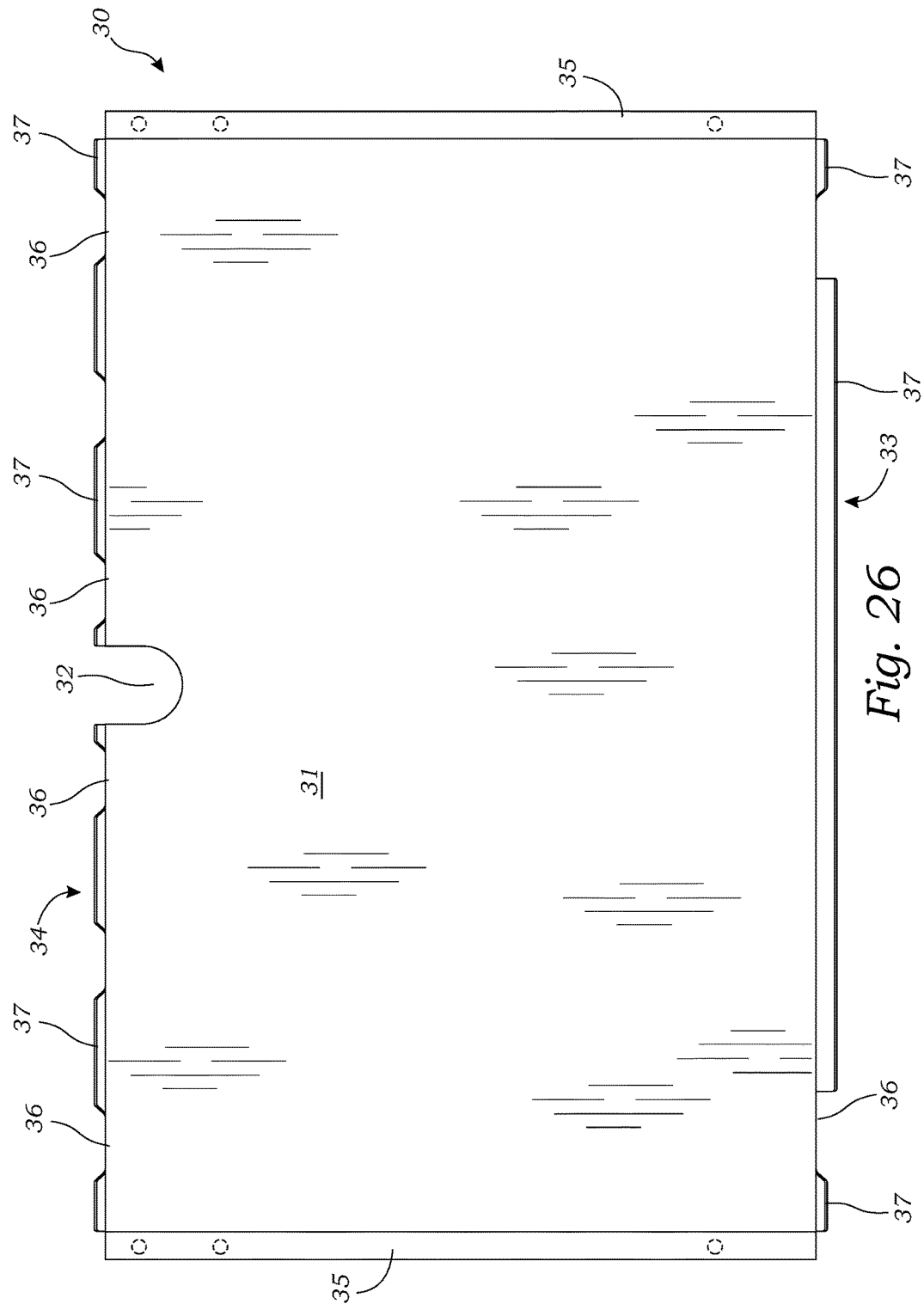
FIG. 26 is a bottom plan view of the third embodiment of the vehicle roof plate.
Figure 27:
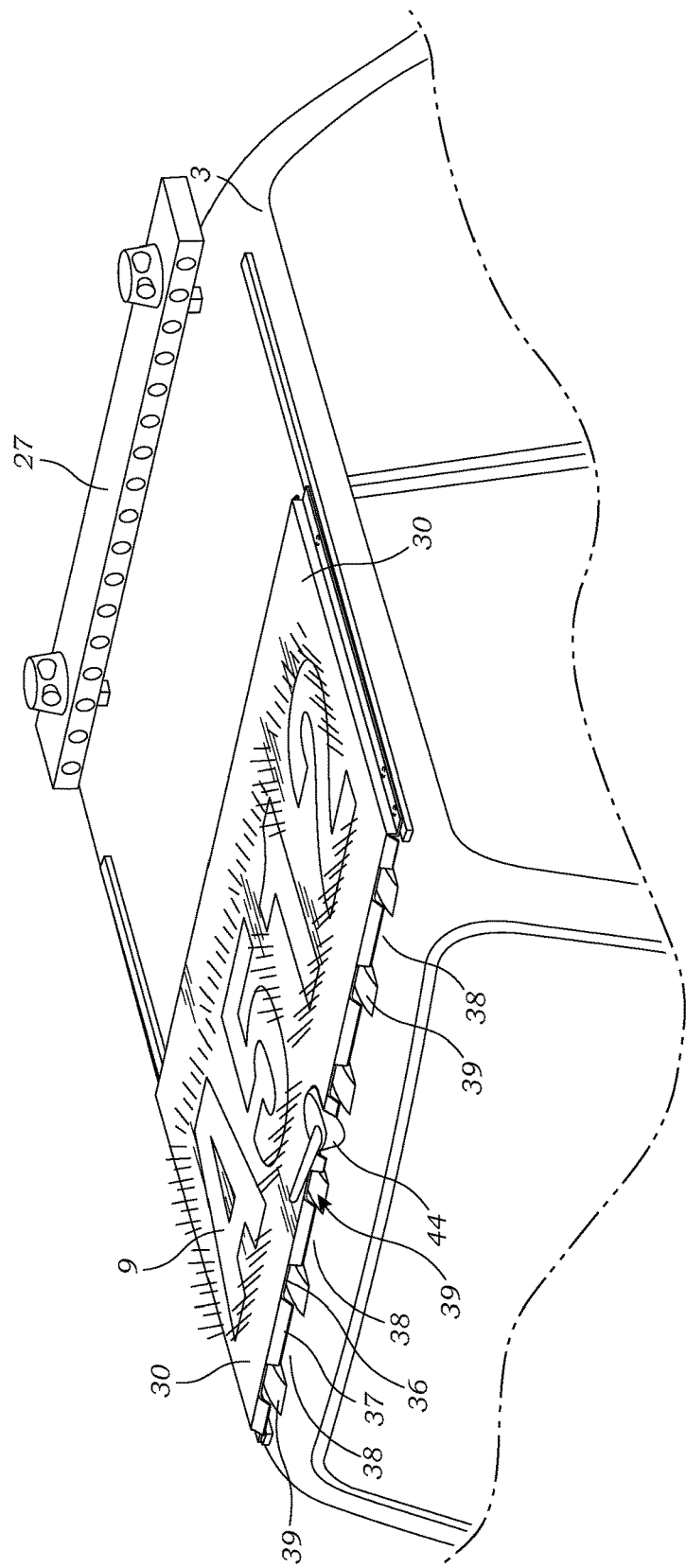
FIG. 27 is a top perspective view illustrating the third embodiment of the vehicular roof plate affixed to the corrugated roof of a vehicle and supporting emergency response vehicle identification characters.

In still an additional embodiment illustrated in FIGS. 8-10, the luminescent planar sheet 7 is constructed in the form of one or more electroluminescent (EL) panel lamps. The electroluminescent panels may be constructed in various forms such as described in U.S. Pat. No. 5,045,755. Alternatively, the electroluminescent panels may be constructed of organic light emitting diodes or devices (OLED), transparent organic light emitting devices (TOLED), or flexible organic light emitting devices (FOLED).

Advantageously, where the luminescent planar sheet 7 is constructed in the form of an EL panel 9, the EL panel can be adhered directly to one of the vehicle's horizontal planar surface 5. Conversely, where the luminescent planar sheet 7 is constructed to include LEDs or light bulbs 21, the luminescent planar sheet 7 will typically require a frame 15 for holding the light source, as illustrated in FIGS. 2-5. As illustrated in FIG. 10, preferably any wires 58 for supplying power to the luminescent planar sheet can be routed to a vehicle's existing light bar 27.

Figure 28:
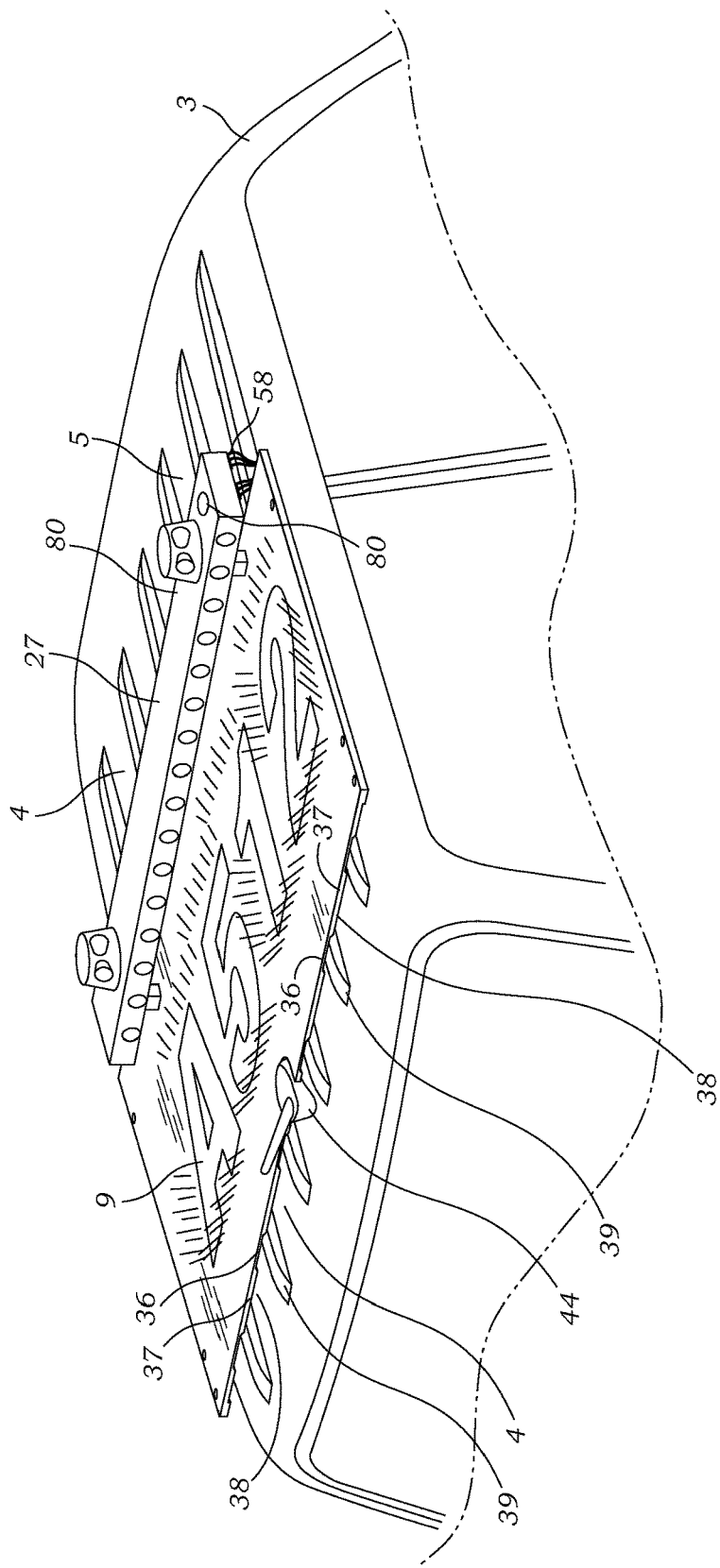
FIG. 28 is a top perspective view illustrating the second embodiment of the vehicular roof plate affixed to the corrugated roof of a vehicle and supporting emergency response vehicle identification characters and a light bar.

In a preferred embodiment, the lighting system may include a light sensor for automatically disabling the luminescent planar sheets when daylight, or other ambient lighting, is sufficiently strong so as to make the light produced by the luminescent indicia unnecessary. The light sensor may be a simple photocell, such as photo-resistor, in series with the wiring which connects the power source to the luminescent indicia. The light sensor automatically opens the electrical circuit, or variably increases the electrical resistance, to inhibit the supply of power to the luminescent indicia. The light sensor (photocell) may be located anywhere on the vehicle. However, as illustrated in FIGS. 10 and 28, in a preferred embodiment, the light sensor 80 is mounted on or otherwise incorporated into the vehicle light bar. Advantageously, the light sensor 80 will prevent the unnecessary use of the luminescent planar sheets during daylight which would unnecessarily utilize battery power and shorten the life of the light source(s).

As illustrated in FIGS. 11-17, in the currently preferred construction of the vehicular lighting system, each luminescent indicia 9 is constructed to include a central electroluminescent portion 40 powered by a first electrical circuit and a thermal/infrared portion 42 powered by a second electrical circuit. Preferably, the thermal/infrared portion is simply a highly resistant material, such as a silver or copper alloy, in the form of the indicia. As illustrated, the silver material 42 may be printed to form an elongate circuit upon the substrate material adjacent to the illuminated portion of the electroluminescent portion 40. In operation, a voltage is applied to the resistant material 42 causing the thermal/infrared portion to be heated to form thermal/infrared indicia.

With reference to FIGS. 8 and 9, where the infrared indicia is produced by heat, it is preferred that the planar luminescent sheet 7 include an insulator layer 43 positioned under the electroluminescent 40 and infrared 42 producing layer so as to prevent heat from dissipating into the vehicle's metal surface. In a preferred embodiment, the insulator layer 43 includes a pre-applied adhesive 45 for applying the planar luminescent sheet(s) 7 to a vehicle. Preferably, the adhesive 45 is covered by a peel away sheet (not shown) which can be easily peeled away by the installer when applying the planar luminescent sheet to a vehicle. Meanwhile, in a preferred embodiment, the bottom surface of the electroluminescent 40 and infrared 42 producing layer includes an adhesive for affixing to the top surface of the insulator layer 43.

In preferred embodiments, the insulator layer 43 has a thickness of at least 0.075 mm, a thermal conductivity of 0.25 W/m-K or less, and a thermal resistance "R-value" of 0.00050 $m^2K/W$ or greater, and wherein "mm" refers to millimeters, "m" refers to meters, "W" refers to watts, and "K" refers to Kelvin. More preferably, the insulator layer 45 has a thickness of at least 0.080 mm and a thermal conductivity of 0.20 W/m-K or less. In still an additional preferred embodiment, the insulator layer 43 incorporates an adhesive 45 for affixing the insulator layer to an object such as a vehicle's planar surface. Preferably, this insulator 43 with adhesive 45 has thickness of at least 0.100 mm and a thermal conductivity of 0.18 W/m-K or less. A preferred insulator material that complies with these requirements is sold by 3M Company under their part number IJ35 which, with adhesive, has a thickness of 0.102 mm, an approximate thermal conductivity of 0.18 W/m-K, and an approximate thermal resistance R-value of 0.00055 $m^2K/W$ as tested in accordance with ASTM E1530 Rev. 11.

A preferred illuminated vehicle sign of the present invention utilizes electroluminescent indicia 40 operating at 14.4 volts and 800 Hz. To provide these power characteristics, preferably an inverter (not shown) converts the vehicle's DC 12 volts to a nominal 14.4 volts and 800 Hz. However, alphanumeric characters of the same font size have different surface areas. For example, preferred electroluminescent numbers having the same 20 inch height have the following respective surface areas:

| Number | Square Inches |
| --- | --- |
| 0 | 117 |
| 1 | 68 |
| 2 | 110 |
| 3 | 98 |
| 4 | 107 |
| 5 | 113 |
| 6 | 110 |
| 7 | 78 |
| 8 | 121 |
| 9 | 110 |

It has been discovered that providing each of the numerals with the same wattage results in some numbers being brighter than others. Similarly, if the same wattage is provided to each thermal/infrared portion of the luminescent indicia, this will result in some indicia having a much greater temperature than other indicia or will result in alphanumeric characters with lesser surface areas "burning" out quicker than others. Moreover, it is common to substitute the alphanumeric characters atop emergency response vehicles.

To overcome these problems, as illustrated in FIGS. 11-17, the switching system 50 of the present invention includes adjustable variable resistors 64 and 74 which adjust the current, and accordingly, the wattage provided to the electroluminescent portion and/or thermal/infrared portion of the indicia to provide uniform luminescence. In one embodiment of the invention, the adjustable variable resistors 64 and 74 are controlled automatically based upon automated determinations of the size of each indicia. To this end, preferably the switching system includes one or more resistance, current, voltage, or wattage sensors for measuring the resistance, current, voltage or wattage of the electroluminescent portion and/or thermal/infrared portion of the luminescent planar sheets, and includes a controller for automatically adjusting the resistance of the adjustable variable resistors 64 and 74 based upon measurements made by these sensors. The circuitry for providing this automatic adjustment of the adjustable variable resistors 64 and 74 can be determined by those skilled in the art without undue experimentation.

In an alternative embodiment of the invention illustrated in FIGS. 11-17, the switching system 50 includes manually controlled variable resistors 64 and 74. Preferably, the switching system 50 includes on/off switches 62 and 72 for activating and deactivating either the electroluminescent portions and/or the thermal/infrared portions 42, and includes manually rotatable switches 64 and 74 for varying the resistance, and thus wattage provided to the electroluminescent portions and/or the thermal/infrared portions 42. Though illustrated in FIGS. 11-17 as in one control box, it is preferred that the on/off switches 62 and 72 be located within the vehicle cabin so as to be easily accessible to emergency response personnel, and it is preferred that the manually rotatable switches 64 and 74 be located so as to be accessible only during installation of vehicular illuminated sign 1 so as to not be inadvertently altered after installation.

In still an additional embodiment, the luminescent panels include one or more resistors (not shown) located within each of the luminescent panels to provide uniform electrical characteristics across the spectrum of different alphanumeric characters. More specifically, for this embodiment, the luminescent indicia are constructed to include resistors electrically connected to the electroluminescent circuitry and/or the thermal/infrared circuitry so that alphanumeric characters of different surface areas can be swapped but still provide uniform luminescence.

With reference to FIGS. 3, 8 and 9, preferably the top surfaces of the luminescent panels include a protective coating 41. Because the luminescent panels of the present invention preferably produce light in the visible light spectrum and/or infrared spectrum, it is preferred that the protective coating is substantially translucent within these spectrums of light. However, it is preferred that the protective coating blocks most or substantially all light in the ultraviolet (UV) light spectrum.

The protective coating 41 will provide protection against abrasion and various forms of environmental radiation. The protective coating may take various forms. For example, the protective coating may be incorporated in the manufacturing process utilizing a spray coating. However, a laminate application is preferred. Where the luminescent panel is an electroluminescent panel, it is preferred that the protective coating forms the upper layer of the electroluminescent panel and is preferably a flexible plastic. Moreover, it is preferred that the protective coating blocks at least 60% of ultraviolet light below 350 nanometers, and even more preferably blocks at least 90% of ultraviolet light below 350 nanometers. Conversely, it is preferred that the protective coating allow at least 80% transmission of visible infrared light above 450 nanometers, and even more preferably allow at least 85% of visible and infrared light above 500 nanometers. Furthermore, it is preferred that the protective coating have an adhesive 45 (seen in FIG. 8) formed on its bottom surface for applying the protective coating 41 to the top surface of the luminescent planar sheets 7. Acceptable protective coatings providing these characteristics include polyvinyl fluoride (PVF) films, polymethyl methacrylate films, Tedlar from Dupont, and Acrylar from 3M Company.

Advantageously, the luminescent panels of the present invention are controlled by the control processor so as to illuminate in only the visible spectrum of light, or in only the invisible infrared spectrum of light, or simultaneously in both the visible and infrared light spectrums. Furthermore, and advantageously, the protective coating permits the passage of most of the visible light and infrared light produced by the luminescent panel, while blocking most of the ultraviolet light. Accordingly, the luminescent panel of the present invention is capable of producing visible light between 400 nanometers and 760 nanometers, or producing infrared light above 760 nanometers while not producing appreciable visible light below 760 nanometers, or producing both visible light, and infrared light.

Currently, non-illuminated indicia are adhered directly to the roof and trunk areas of emergency response vehicles. Similarly, the luminescent planar panels may be affixed to the vehicle's horizontal surfaces using adhesives or the like. Alternatively, the luminescent planar panels are affixed to a supplemental structure mounted on the vehicle. In a preferred embodiment, the vehicle is constructed to support a traditional roof rack, and to this end, the vehicle also includes four or more threaded bolt holes installed by the original manufacturer of the vehicle. If installed, the traditional roof rack of horizontally extending bars is removed. Instead, with reference to FIGS. 11-12, the vehicle is equipped with a planar plate 30 which includes flanges 35 that extend downwardly to mount to the vehicle bolt holes. Bolts, or other threaded fasteners, are employed to affix the planar plate 30 in place. Where the vehicle roof includes a plurality of longitudinal troughs, the bolt holes may be located in such troughs. For this construction, the planar plate is preferably constructed to include elongate flanges 35 along its left and right edges that will project into the troughs where vehicle threaded bolt holes are located. The flanges 35 include holes for receiving male fasteners which mount to the vehicle bolt holes.

With reference to FIGS. 18-22, in a preferred embodiment, the planar roof plate 30 has a top wall 31 including the top surface, two sidewalls 35 in the form of downwardly extending flanges, a front wall 33 and a rear wall 34. Small holes, ports or slots 32 may be drilled or formed into the top wall 31, left and right sidewalls 35, or front 33 and rear walls 34 for the routing of electrical wiring. However, it is preferred that the two sidewalls 35, front wall 33 and rear wall 34 are sized and constructed to engage the vehicle roof 4 substantially along their lengths to form a central cavity 51 between the vehicle roof 4 and top wall 31. It is preferred that any wiring to the light bar 27 or luminescent indicia upon the roof plate be located in the central cavity 51. Preferably, a single hole (not shown) is formed into the vehicle roof under the roof plate 30 to permit the routing of all wiring from the vehicle switching system and power supply to the light bar 27, luminescent indicia 9 and antennae 44. It is preferred that the cavity 51 be sufficiently high, at least one-eighth (⅛) inch and more preferably at least one-quarter (¼) inch, so as to allow the routing of traditional low voltage electrical cables. However, it is preferred that the height of the cavity 51 be minimal, less that two (2) inches and more preferably less than one (1) inch, to minimize the overall height of the planar roof plate 30.

In a preferred embodiment not shown in the figures, where the vehicle roof is not corrugated but instead relatively smooth, it is preferred that the planar roof plate's front and rear walls also be relatively smooth to conform and engage the vehicle's top surface. Unfortunately, vehicles having corrugated roofs result in the alphanumeric characters being warped when adhered to such roofs and difficult to read from above, such as by those in helicopters. As illustrated in FIGS. 18-27, in preferred embodiments, preferred roof plates 30 are specifically constructed to engage and conform to the corrugated features of a vehicle roof. Specifically, a vehicle's corrugated roof 4 includes recessed troughs 38 formed by projecting ridges 39. The troughs and ridges extend longitudinally from the front to the back upon a vehicle's roof and are provided to provide greater stiffness and support. For these embodiments, the planar plate's bottom surface, or front and rear walls, are not wholly planar. Instead, the planar plate's bottom surface or front and rear walls include a plurality of "teeth" 37 sized for projecting into the vehicle roofs troughs 38. The plate teeth 37 form channels 36 for receiving a vehicle roof's ridges 39.

As illustrated in FIGS. 18-22, a vehicle's corrugated roof may be relatively uniform from front to back providing troughs and ridges which extend longitudinally having the same width and depth where the roof plate 30 is intended to be mounted upon the vehicle roof 4. Accordingly, as illustrated in FIG. 19, for this embodiment the roof plate's channels 36 and teeth 37 are of approximately the same size at the roof plate's front as at the roof plate's rear. The roof plate's channels 36 and teeth 37 may extend longitudinally the entire length of the roof plate from front to back. Alternatively, as best illustrated in FIG. 19, the roof plate channels 36 and teeth 37 may be located only at the roof plate's front and rear edges so as to provide improved aerodynamics and support for the planar plate 30 upon the corrugated roof 4 of a vehicle 3. However, not all vehicles have vehicle troughs and ridges which extend with uniform width and depth. For example, as illustrated in FIGS. 23-29, the planar plate 30 may include a front or rear wall (illustrated as the rear wall 34) which includes a bottom surface formed to include channels 36 and teeth 37 for conforming with the corrugated roofs troughs 38 and ridges 39. However, towards the opposite edge of the roof plate, the vehicle's roof may not be corrugated. Accordingly, the planar plate 30 of this embodiment has an opposite edge (illustrated as the front wall 33) which does not include a plurality of teeth and channels.

The planar plate 30 may be constructed of various materials and manufactured by various methods as can be determined by those skilled in the art. For example, the planar plate illustrated in FIGS. 18-22 is preferably made of a durable plastic such as polyethylene, polystyrene, or acrylonitrile butadiene styrene which is machine or molded. An alternative preferred roof plate illustrated in FIGS. 23-27 is made of metal such as steel, aluminum or titanium and is stamped to form the plate's front wall and rear wall channels 36 and teeth 37.

Figure 29:
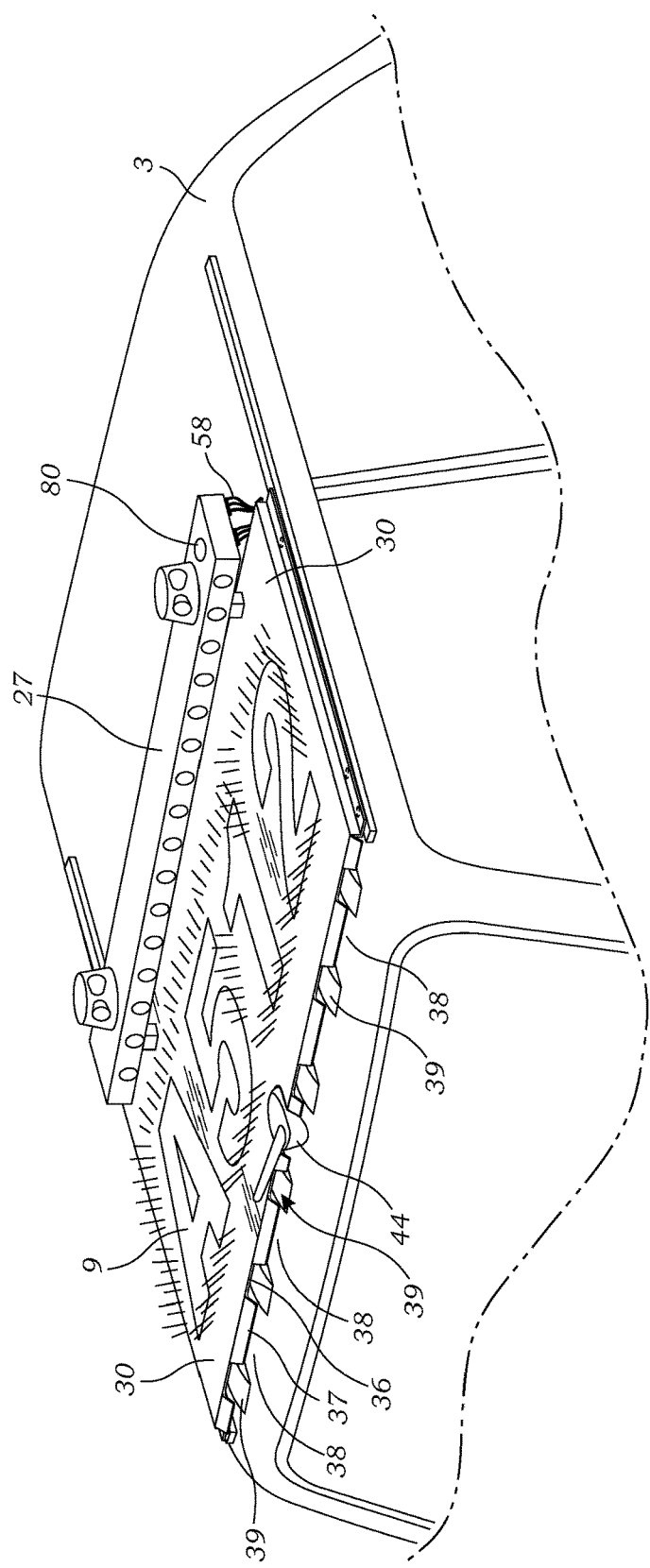
FIG. 29 is a top perspective view illustrating the third embodiment of the vehicular roof plate affixed to the corrugated roof of a vehicle and supporting emergency response vehicle identification characters and a light bar.

As illustrated in FIGS. 11-16, the planar plate is preferably rectangular. However, the planar plate may incorporate subtle curves for improved aerodynamics or aesthetics. Furthermore, as illustrated in FIGS. 18-27, the planar plate 30 may include a notch or hole 32 for permitting the passage of a radio frequency antennae 44 typically mounted upon the roofs 4 of emergency response vehicles 3. Furthermore, as illustrated in FIGS. 28 and 29, the light bar 27 may also be mounted to the planar plate 30 to reduce or eliminate holes drilled into the vehicle after leaving the original manufacturer. For this embodiment, it is preferred that the system include electrical wiring 58 that connects the light bar 27 to the luminescent indicia 9.

While several particular forms of the invention have been illustrated and described, it will be apparent that various modifications can be made without departing from the spirit and scope of the invention. Accordingly, it is not intended that the invention be limited except by the following claims.

I claim:

1. A vehicular luminescent indicia assembly comprising:
    a vehicle having a surface;
    one or more luminescent planar sheets constructed to provide luminescent indicia in the form of one or more letters or numbers, said one or more luminescent planar sheets affixed upon said surface so as to face and emit light perpendicular to said surface;
    an emergency response vehicle light bar affixed to said surface, said light bar constructed and affixed to said surface so as to emit light parallel to said surface, and thus perpendicular to light emitted from said one or more luminescent planar sheets;
    a power source for providing power to said one or more luminescent planar sheets; and
    a light sensor electrically connected between said power source and said one or more luminescent planar sheets, said light sensor automatically disabling the luminescent panels when ambient light is above a predetermined threshold.

2. The vehicular light bar and luminescent indicia assembly of claim 1 wherein said light sensor is positioned upon said light bar.

3. The vehicular light bar and luminescent indicia assembly of claim 1 wherein said one or more luminescent planar sheets are electro-luminescent panels.

4. The vehicular light bar and luminescent indicia assembly of claim 1 wherein said one or more luminescent planar sheets comprise one or more light pipes connected to light emitting diodes (LEDs).

5. The vehicular light bar and luminescent indicia assembly of claim 1 wherein the luminescent planar sheets can produce light that is not visible to the human eye.

6. The vehicular light bar and luminescent indicia assembly of claim 1 wherein said vehicle has only one power source in the form of a battery which also provides power to the vehicle's remaining electrical systems.

7. The vehicular light bar and luminescent indicia assembly of claim 1 wherein said letters or numbers have a length of at least 18 inches.

8. The vehicular light bar and luminescent indicia assembly of claim 1 wherein said letters or numbers have a length of 18 inches to 48 inches.

9. A vehicular light bar and luminescent indicia assembly comprising:
    a vehicle having four or more wheels, the vehicle having at least one substantially horizontal planar surface in the form of a hood surface, cabin roof surface, or trunk surface;
    a frame which engages and affixes directly to said vehicle's horizontal planar surface, said frame having a horizontal planar surface;
    an emergency response vehicle light bar affixed to said frame, said light bar constructed and affixed to said frame so as to emit light horizontally;
    one or more luminescent planar sheets, said one or more luminescent planar sheets affixed upon said frame's horizontal planar surface and constructed to provide luminescent indicia in the form of one or more letters or numbers which face upwardly so as to emit light upwardly so as to be seen from above; and
    a power source for providing power to said light bar and said one or more luminescent planar sheets; and
    a light sensor electrically connected between said power source and said one or more luminescent planar sheets, said light sensor automatically disabling the luminescent panels when ambient light is above a predetermined threshold.

10. The vehicular light bar and luminescent indicia assembly of claim 9 wherein said light sensor is positioned upon said light bar.

11. The vehicular light bar and luminescent indicia assembly of claim 9 wherein said one or more luminescent planar sheets are electro-luminescent panels.

12. The vehicular light bar and luminescent indicia assembly of claim 9 wherein said one or more luminescent planar sheets comprise one or more light pipes connected to light emitting diodes (LEDs).

13. The vehicular light bar and luminescent indicia assembly of claim 9 wherein the luminescent planar sheets can produce light that is not visible to the human eye.

14. The vehicular light bar and luminescent indicia assembly of claim 9 wherein said letters or numbers have a length of at least 18 inches.

15. The vehicular light bar and luminescent indicia assembly of claim 9 wherein said letters or numbers have a length of 18 inches to 48 inches.

* * * * *